(12) United States Patent
Imasaka et al.

(10) Patent No.: US 10,310,264 B2
(45) Date of Patent: Jun. 4, 2019

(54) VIRTUAL IMAGE DISPLAY DEVICE

(71) Applicant: PIONEER CORPORATION, Kanagawa (JP)

(72) Inventors: Yusuke Imasaka, Saitama (JP); Kenji Nakamura, Saitama (JP); Hideaki Takahashi, Saitama (JP); Shunichiro Nagao, Saitama (JP); Chihiro Hirose, Saitama (JP); Atsushi Honda, Saitama (JP)

(73) Assignee: PIONEER CORPORATION, Tokyo (JP)

( * ) Notice: Subject to any disclaimer, the term of this patent is extended or adjusted under 35 U.S.C. 154(b) by 0 days.

(21) Appl. No.: 15/948,862

(22) Filed: Apr. 9, 2018

(65) Prior Publication Data

US 2018/0231776 A1 Aug. 16, 2018

Related U.S. Application Data

(62) Division of application No. 14/781,745, filed as application No. PCT/JP2013/059883 on Apr. 1, 2013, now abandoned.

(51) Int. Cl.
*G02B 27/14* (2006.01)
*G02B 27/10* (2006.01)
(Continued)

(52) U.S. Cl.
CPC ............ *G02B 27/0149* (2013.01); *B60R 1/00* (2013.01); *B60R 11/0229* (2013.01);
(Continued)

(58) Field of Classification Search
CPC ............ G02B 27/0172; G02B 27/0101; G02B 2027/0178; G02B 2027/0132; G02B 2027/011; G02B 27/01
USPC ................ 359/630–684, 409–410, 462, 466, 359/638–639, 626, 13–14, 603–636, 404, 359/407; 348/115; 345/7, 9, 156;
(Continued)

(56) References Cited

U.S. PATENT DOCUMENTS

2003/0043029 A1  3/2003  Ichikawa et al.
2006/0103590 A1*  5/2006  Divon .................... G02B 27/01
                                                                    345/7

(Continued)

FOREIGN PATENT DOCUMENTS

JP    10-254336     9/1998
JP    2001-333351   11/2001
(Continued)

OTHER PUBLICATIONS

International Search Report, PCT/JP2013/059883, dated Jul. 2, 2013.

*Primary Examiner* — Dawayne Pinkney
(74) *Attorney, Agent, or Firm* — Young & Thompson

(57) ABSTRACT

A virtual image display device is provided with a portable terminal holding unit, a combiner and base unit. The portable terminal holding unit detachably holds a portable terminal equipped with a display for displaying a guide image. The combiner reflects the light of the guide image displayed by the portable terminal to let an observer visually recognize the image as a virtual image. The base unit is connected to the portable terminal holding unit and the combiner.

11 Claims, 15 Drawing Sheets

(51) Int. Cl.
*H04N 7/00* (2011.01)
*G09G 5/00* (2006.01)
*G02F 1/1335* (2006.01)
*G02B 27/01* (2006.01)
*B60R 11/02* (2006.01)
*B60R 1/00* (2006.01)
*B60R 11/00* (2006.01)

(52) U.S. Cl.
CPC ...... *B60R 11/0235* (2013.01); *G02B 27/0101*
(2013.01); *B60R 2011/008* (2013.01); *B60R 2011/0035* (2013.01); *B60R 2011/0059* (2013.01); *B60R 2300/205* (2013.01); *G02B 2027/013* (2013.01); *G02B 2027/0118* (2013.01); *G02B 2027/0127* (2013.01); *G02B 2027/0159* (2013.01); *G02B 2027/0161* (2013.01)

(58) Field of Classification Search
USPC ................ 349/11; 701/1; 310/49 R, 156.32, 310/156.33, 156.34, 156.35, 266–268, 310/156.02; 340/438, 980, 995.1, 815.47, 340/815.74
See application file for complete search history.

(56) References Cited

U.S. PATENT DOCUMENTS

| | | |
|---|---|---|
| 2007/0019297 A1 | 1/2007 | Stewart |
| 2008/0218434 A1 | 9/2008 | Kelly |
| 2009/0067057 A1 | 3/2009 | Sprague et al. |

FOREIGN PATENT DOCUMENTS

| | | |
|---|---|---|
| JP | 2002-052953 | 2/2002 |
| JP | 2003-72426 | 3/2003 |
| JP | 2006-154069 | 6/2006 |
| JP | 2010-539525 | 12/2010 |
| JP | 4907744 | 4/2012 |
| JP | 2012-145787 | 8/2012 |
| JP | 2012-245953 | 12/2012 |
| WO | WO 2012/169422 | 12/2012 |

* cited by examiner

VIRTUAL IMAGE DISPLAY DEVICE

TECHNICAL FIELD

The present invention relates to a technology for displaying a virtual image.

BACKGROUND TECHNIQUE

Conventionally, there is proposed a technique of a head-up display letting a driver see an image indicating information on the driving of the vehicle from the eye position (eye point) as a virtual image. Patent Reference-1 discloses an information display device capable of being installed in a vehicle to function as a head-up display. It also functions as a portable information display device when it is detached from the vehicle. The information display device according to Patent Reference-1 inverses the image for displaying on the display screen when detecting that it is used as a head-up display.

Patent Reference-1: Japanese Patent Application Laid-open under No. 2001-333351

DISCLOSURE OF INVENTION

Problem to be Solved by the Invention

The information display device according to Patent Reference-1 is a machine specialized in the display as the portable information display device and the display as the head-up display. In contrast, it could be convenient to configure a head-up display by using the display of a portable terminal such as a mobile phone which the user has. An object of the present invention is to provide a virtual image display device capable of displaying a virtual image by use of a portable terminal.

Means for Solving the Problem

One invention is a virtual image display device including: a holding unit configured to detachably hold a portable terminal equipped with a display surface for displaying an image; a combiner configured to reflect light of the image to let an observer visually recognize the image as a virtual image; and a base unit connected to the holding unit and the combiner.

DETAILED DESCRIPTION OF THE PREFERRED EMBODIMENTS

Figure 1:
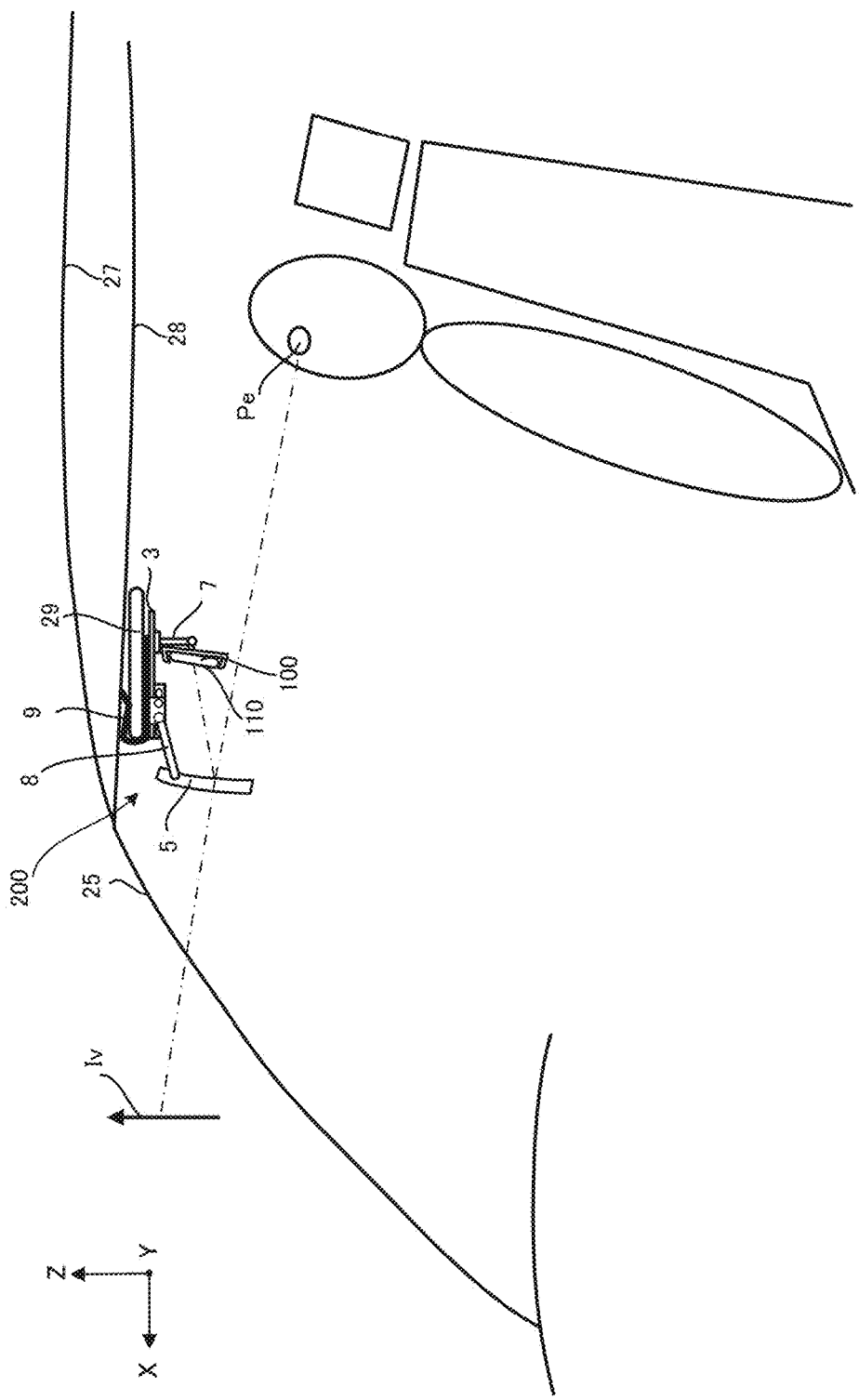
FIG. 1 schematically illustrates a virtual image display system according to a first embodiment.

According to a preferable embodiment of the present invention, there is provided a virtual image display device including: a holding unit configured to detachably hold a portable terminal equipped with a display surface for displaying an image; a combiner configured to reflect light of the image to let an observer visually recognize the image as a virtual image; and a base unit connected to the holding unit and the combiner.

The above virtual image display device includes a holding unit, a combiner, and a base unit. The holding unit is configured to detachably hold a portable terminal equipped with a display surface for displaying an image. The combiner is configured to reflect light of the image to let an observer visually recognize the image as a virtual image. The base unit is connected to the holding unit and the combiner. As mentioned above, the virtual image display device is configured to detachably hold the portable terminal and use the portable terminal as a light source. Thus, the virtual image display device can preferably let the observer visually recognize a virtual image by using the portable terminal which the observer has.

In one mode of the virtual image display device, the base unit is connected to a ceiling part of a vehicle or an attachment unit configured to be attached to a sun visor on the ceiling part.

In another mode of the virtual image display device, the base unit includes a connecting member configured to rotatably connect the base unit to the attachment unit. In still another mode of the virtual image display device, the holding unit holds the portable terminal in a state that a normal line of the display surface passes above a center point of a reflection surface of the combiner. According to this mode, the portable terminal is preferably held to broaden the clearance around the head of the observer.

In still another mode of the virtual image display device, the combiner has a concave reflection surface whose curvature becomes gradually larger at a position closer to a bottom of the combiner and farther from a top of the combiner. According to this mode, it is possible to prevent the top of the virtual image from being displayed to be shorter in width than the bottom of the virtual image even when the display surface of the portable terminal is directed above the center point of the combiner. Additionally, it is possible to let the observer visually recognize the whole virtual image with a proper feeling of distance.

In still another mode of the virtual image display device, the curvature of the reflection surface gradually varies so that image formation distance of the virtual image corresponding to the bottom of the combiner is longer than the image formation distance of the virtual image corresponding to the top of the combiner. This mode enables the observer visually recognize the virtual image with a proper feeling of distance in accordance with its contents in a case of displaying the virtual image indicating information on an object whose position becomes farther from the present position as the position corresponds to a portion close to the bottom of the virtual image.

In still another mode of the virtual image display device, the holding unit is rotatably connected to the base unit to be configured to direct the display surface of the portable terminal held by the holding unit to the combiner and to the observer. This mode enables the observer to preferably operate the portable terminal whose display surface faces the observer.

In still another mode of the virtual image display device, the holding unit is connected to the base unit to be configured to change distance between the holding unit and the combiner. According to this mode, it is possible to adjust the clearance of the head of the observer.

In still another mode of the virtual image display device, the virtual image display device further includes a sending unit configured to send information on a type of the virtual image display device used for the portable terminal to switch a display mode of the image displayed on the display surface, and the sending unit sends the information on the type to the portable terminal at a time when distance between the holding unit and the portable terminal is equal to or shorter than a predetermined distance. The virtual image display device according to this mode enables the portable terminal to determine the display mode of the guide image so that the observer can properly see the virtual image.

In still another mode of the virtual image display device, the virtual image display device includes a reflection unit connected to the base unit to reflect the light of the image displayed on the display surface of the portable terminal to the combiner, wherein the holding unit holds and directs the display surface of the portable terminal to the reflection unit. According to this mode, the virtual image display device can prevent the virtual image from being displayed in a horizontally inverse state to the image displayed by the portable terminal.

In still another mode of the virtual image display device, the holding unit holds the display surface of the portable terminal in substantially parallel with the base unit. According to this mode, the virtual image display device can preferably generate the clearance around the head of the observer.

In still another mode of the virtual image display device, the holding unit is rotatably connected to the base unit to be configured to direct the display surface of the portable terminal held by the holding unit to the reflection unit and to the observer. This mode enables the observer to preferably operate the portable terminal whose display surface faces the observer.

In still another mode of the virtual image display device, the reflection unit is connected to the base unit to be configured to rotate in the same direction as rotational direction of the holding unit, and the holding unit rotates together with the reflection unit within a predetermined angle range of a rotatable range of the reflection unit. This mode enables the observer to preferably operate the portable terminal whose display surface faces the observer.

In still another mode of the virtual image display device, the combiner is connected to the base unit to be configured to change distance from the combiner to the observer. According to this mode, the observer can preferably adjust the position and/or the size of the virtual image.

In still another mode of the virtual image display device, on the combiner, there is provided a light shielding member configured to block out or decay natural light coming against direction in which the virtual image is visually recognized by the observer. According to this mode, the virtual image display device can preferably let the observer visually recognize the virtual image even when the amount of the light outputted by the portable terminal is smaller than the amount of the natural light.

Embodiment

Now, preferred first to fifth embodiments of the present invention will be described below with reference to the attached drawings. Hereinafter, the term "rotation" herein includes both of the clockwise rotation and the counter-clockwise rotation, whose range of movement (angle range) may not be limited.

<First Embodiment>

[Configuration of Head-Up Display]

FIG. 1 schematically illustrates a virtual image display system according to the first embodiment. As illustrated in FIG. 1, the system includes a portable terminal 100 equipped with a display 110, and a virtual image display device 200 configured to let an observer visually recognize the display on the display 110 of the portable terminal 100 as a virtual image Iv. It is noted that FIG. 1 is a side view of the driving seat in a vehicle and the driver sits on the seat in the vehicle. Over the head of the driver, there is provided a roof (plate) 27 which constitutes the outline of the vehicle and a ceiling board 28 thereunder which constitutes the inner decoration of the vehicle. In front of the driver, there is provided a front window 25 of the vehicle.

The portable terminal 100 is a portable device such as a smart phone and an iPad (a registered trademark) for example, and is held by the virtual image display device 200 in such a state that the display 110 is directed to the front window 25. Then, the portable terminal 100 displays on the display 110 an image (referred to as "guide image Im") indicating information such as a map near the present position and a route to a destination in order to support the driving.

The virtual image display device 200 is provided in a diagonally upper forward direction with respect to the driver, and detachably holds the portable terminal 100. The virtual image display device 200 mainly includes a base unit 3, a combiner 5, a portable terminal holding unit 7, arms 8 and a clip unit 9.

Figure 5:
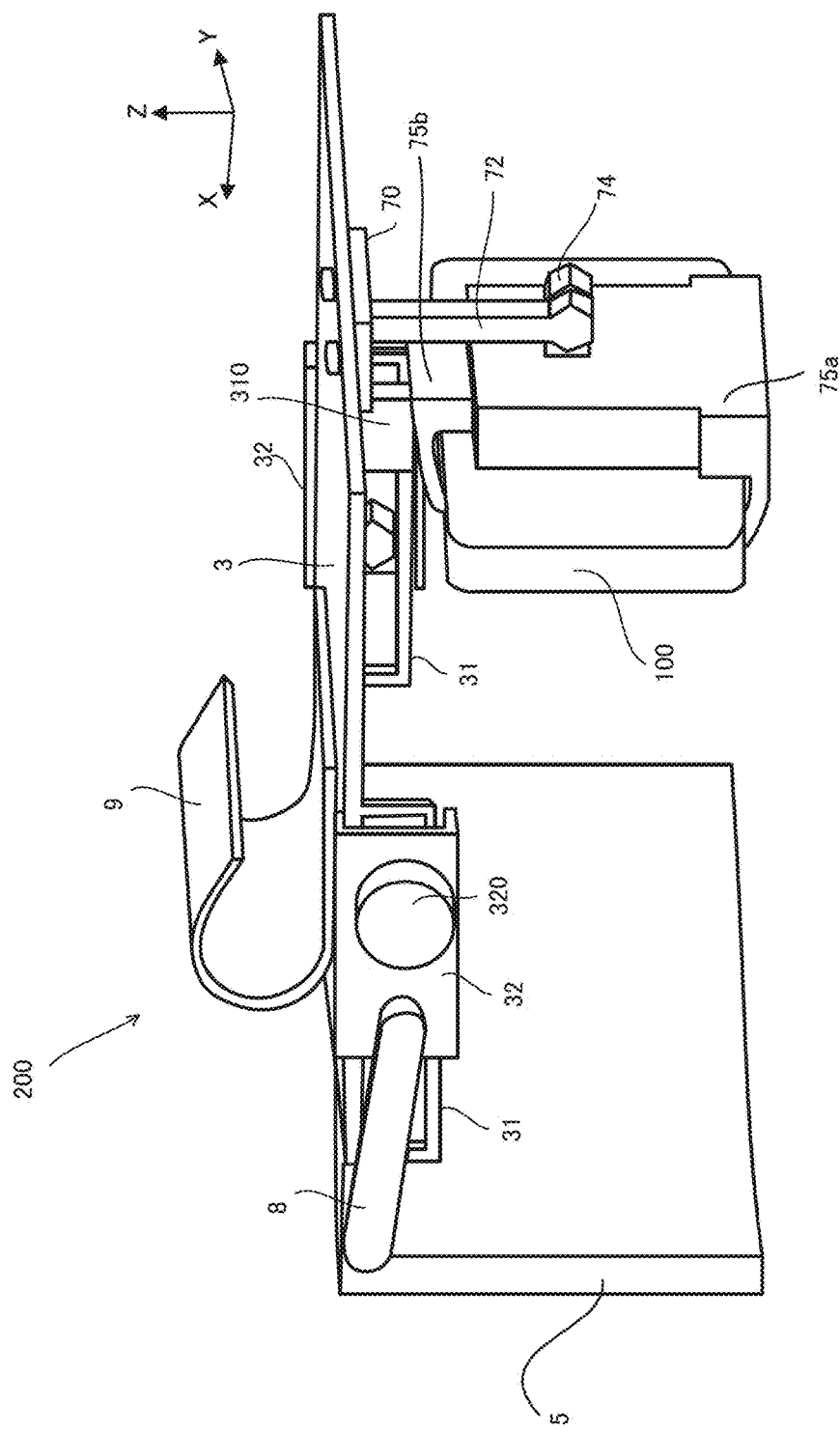
FIG. 5 is a diagrammatic perspective view of the virtual image display device where the portable terminal is installed.

The base unit 3 is formed into a plate, and the portable terminal holding unit 7, the arms 8 holding the combiner 5, and the clip unit 9 are attached to the base unit 3. Hereinafter, the extending direction of the base unit 3 in FIG. 1 is referred to as "X axis direction", the direction perpendicular to the base unit 3 is referred to as "Z axis direction", the direction perpendicular to both of the X axis direction and the Z axis direction is referred to as "Y axis direction", and the positive direction of each axis is defined as illustrated in FIG. 1 and FIG. 5 which is explained later.

The combiner 5 is a half mirror and an optical element which reflects a part of the light of the display 110 of the portable terminal 100 to the eye point "Pe" of the driver to let the driver see the virtual image Iv, while letting the natural light coming from the front of the vehicle pass through the combiner 5. It is noted that the arrow is directed to the upper direction of the virtual image Iv. The surface of the combiner 5 for reflecting the display light is formed into a concave shape. Thereby, the combiner 5 enlarges the display size of the virtual image Iv. The arms 8 are a pair of supporting members attached both edges of the base unit 3 in the Y axis direction, and extend towards the front window 25 in order to sandwich and hold the combiner 5.

The portable terminal holding unit 7 holds the both edges of the portable terminal 100 in such a state that the display 110 of the portable terminal 100 is directed to the combiner 5. On the surface of the portable terminal holding unit 7 in contact with the back surface of the portable terminal 100, there is provided a near field communication tag 6 illustrated in FIG. 4 explained later. The portable terminal holding unit 7 is an example of "the holding unit" according to the present invention.

The near field communication tag 6 is a tag capable of a near field communication such as NFC (Near Field Communication). The near field communication tag 6 sends information (referred to as "type information Ik") on the type of the virtual image display device 200 at the time when the near field communication tag 6 becomes capable of communicating with the portable terminal 100 by being installed on the portable terminal holding unit 7. The type information Ik is information used for the portable terminal 100 to determine the display mode of the guide image Im on the display 110. The detail thereof will be explained later.

The clip unit 9 is provided on the top surface of the base unit 3 which is directed to the ceiling board 28, and fixes the base unit 3 to the sun visor 29 by sandwiching the sun visor 29. The clip unit 9 is a plate elastic body bent so that the cross-section surface is shaped into like a J character. The clip unit 9 has elastic force applied in the direction that the sun visor 29 is sandwiched. The clip unit 9 is an example of "the attachment unit" according to the present invention.

[Configuration of Portable Terminal]

Figure 2:
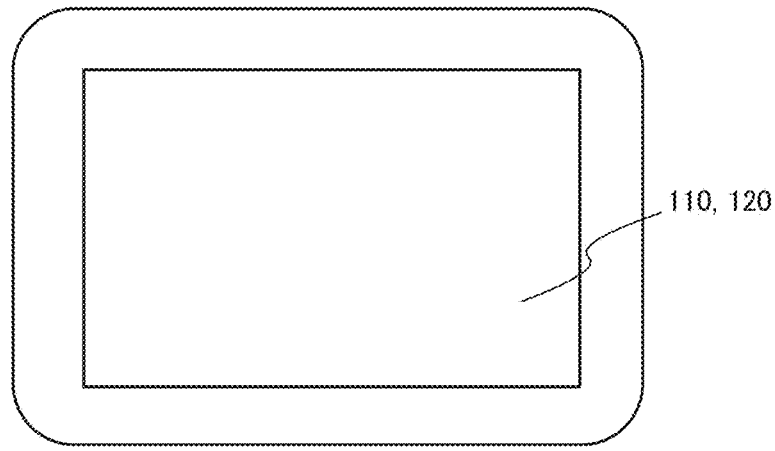
FIG. 2 is a front view of a portable terminal.

Next, a description will be given of the configuration of the portable terminal 100. FIG. 2 is a front view of the portable terminal 100. The portable terminal 100 is a portable terminal which the user can carry and includes the display 110 overlapping with a touch panel 120.

Figure 3:
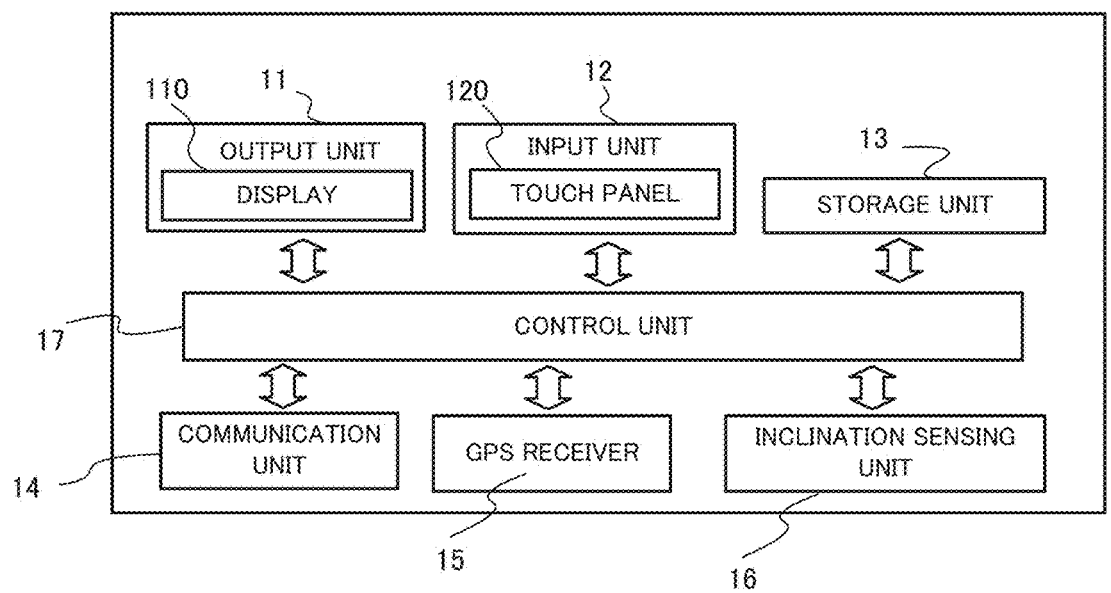
FIG. 3 is a schematic configuration of the portable terminal.

FIG. 3 is a schematic configuration of the portable terminal 100. As shown in FIG. 3, the portable terminal 100 includes an output unit 11, an input unit 12, a storage unit 13, a communication unit 14, a GPS receiver 15, an inclination sensing unit 16, and a control unit 17. The components of the portable terminal 100 are connected to each other via a bus line which is not shown, and capable of exchanging necessary information among them.

The output unit 11 includes the display 110 and a speaker which is not shown, and outputs information for responding to an operation from the user of the terminal device 100 under the control of the control unit 17.

The input unit 12 includes the touch panel 120 and functions as an interface for accepting an input of information or necessary commands through the operation from the user to the terminal device 100. In addition to the touch panel 120, the input unit 120 may also include a key, a switch, a button, and/or a voice input device for inputting various commands and data.

The storage unit 13 stores programs for controlling the terminal device 100 and information necessary for the performance of the terminal device 100. The storage unit 13 also stores information of the size of the display 110.

The communication unit 14 exchanges data with other units in accordance with a predetermined communication protocol. Specifically, according to the embodiment, in the state that the portable terminal 100 is held by the portable terminal holding unit 7, the communication unit 14 receives the type information Ik from the near field communication tag 6 by wireless communication with the near field communication tag 6 shown in FIG. 4.

The GPS receiver 15 receives an electric wave for transmitting downlink data including position measurement data from plural GPS satellites. Thereby, the GPS receiver 15 generates present position information of the portable terminal 100 and sends it to the control unit 17. The inclination sensing unit 16 is an acceleration sensor or a gyroscope for example, and senses the inclination (tilt) of the terminal device 100. The inclination sensing unit 16 sends a generated detection signal to the control unit 17. It is noted that the inclination sensing unit 16 may sense not only the inclination in such a rotational direction that the portable terminal 100 in the front view illustrated in FIG. 2 is rotated but also such a rotational direction that the portable terminal 100 is rotated around the longitudinal direction or the short direction of the portable terminal 100.

The control unit 17 includes a CPU (Central Processing Unit), a ROM (Read Only Memory), and a RAM (Random Access Memory) which are not shown, and executes various kinds of controls of each component in the terminal device 100 by executing application software stored on the storage unit 13. For example, on the basis of the type information Ik sent from the virtual image display device 200, the control unit 17 determines the display mode of the guide image Im so that the observer preferably see the virtual image Iv. The detail of the control method thereof will be explained in the section "Display Control Method".

[Detail Configuration of Virtual Display Device]

Figure 4:
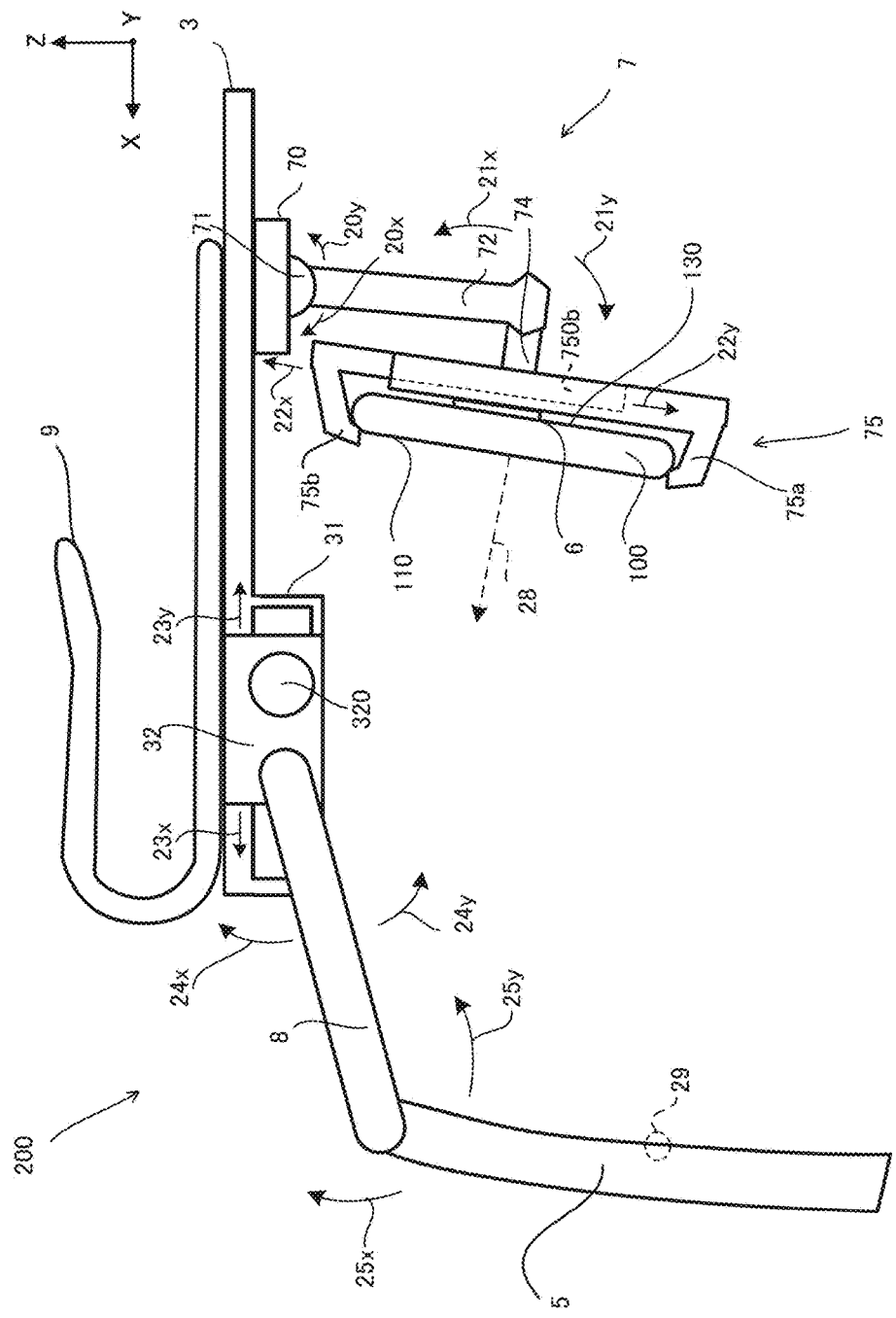
FIG. 4 schematically illustrates a side view of a virtual image display device where the portable terminal is installed.

Next, a description will be given of the detail configuration of the virtual image display device 200 with reference to FIGS. 4 and 5. FIG. 4 schematically illustrates the side view of the virtual image display device 200 where the portable terminal 100 is installed. FIG. 5 is a diagrammatic perspective view of the virtual image display device 200 where the portable terminal 100 is installed. In either case of FIGS. 4 and 5, the portable terminal 100 is held by the portable terminal holding unit 7 in the horizontally-long state, i.e., in such a state that the longitudinal direction of the portable terminal 100 is parallel to the Y axis.

(1) Position Adjustment Mechanism of Combiner

First, a description will be given of a mechanism for adjusting the position of the combiner 5.

On both sides of the base unit 3 in the Y axis direction, as illustrated in FIGS. 4 and 5, there are provided guide parts 31 for sliding the arms 8 in the X axis direction. Each of the guide parts 31 has an opening (a hole) extending along the X axis direction. The slide parts 32 connected to edges of the arms 8 are slidably fitted in the guide parts 31 in a state that they can slide along the X axis direction (see arrows 23x and 23y in FIG. 4). On each of the slide parts 32, there is provided a restriction part 320 which restricts the moving range of the slide part 32 to the range of the opening of the guide part 31. The restriction parts 320 are fixed at the slide parts 32 and inserted to the openings of the guide parts 31 to slide along the openings in the X axis direction.

The arms 8 are configured to rotate towards the vertical direction (see arrows 24x and 24y in FIG. 4) of the virtual image display device 200 around their edges connected to the slide parts 32. The other edges opposite to the above-mentioned edges of the arms 8 hold the combiner 5 so that the combiner 5 can rotate around the Y axis (see arrows 25x and 25y in FIG. 4).

The above-mentioned configuration enables the user to preferably adjust the position of the combiner 5 in the X axis direction by operating the slide parts 32. Generally, the display position and the size of the virtual image Iv depend on the distance between the combiner 5 and the display 110 where the display image is displayed. Thus, the user can adjust the display position and the size of the virtual image Iv by adjusting the position of the combiner 5 in the X axis direction by using the slide parts 32. Additionally, the user can preferably adjust the position of the combiner 5 by adjusting the angle at which the arms 8 are set to the slide parts 32 and the angle at which the combiner 5 is set to the arms 8. Thus, the virtual image display device 200 can preferably cope with the difference of the height of the ceiling per vehicle on which the virtual image display device 200 is installed and the difference of the physical size per user.

(2) Positional Mechanism of Portable Terminal

Next, a description will be given of a mechanism for adjusting the position of the portable terminal 100 with reference to FIGS. 4 and 5.

The portable terminal holding unit 7 includes an installation part 70, a hinge part 71, a first arm 72, a second arm 74 and a holder 75. The installation part 70 is provided on the base unit 3. On the installation part 70, there is provided the hinge part 71 holding the first arm 72 so that the first arm 72 can rotate around the Y axis (see arrows 20x and 20y in FIG. 4). The other edge of the first arm 72 opposite to the hinge part 71 is connected to the second arm 74. The second arm 74 is rotatably connected to the first arm 72 and rotates around the Y axis (see arrows 21x and 21y). The second arm 74 is connected to the back surface of the holder 75 substantially at a right angle.

The holder 75 sandwiches and holds the portable terminal 100. The holder 75 includes a support part 75a for supporting the portable terminal 100 and a moving part 75b extending from the support part 75a. The edge part 750b of the moving part 75b is put in the support part 75a. The moving part 75b is capable of sliding in the direction (see arrows 22x and 22y) in which the portable terminal 100 is sandwiched. Thereby, the holder 75 can preferably hold the portable terminal 100 regardless of the size of the portable terminal 100. On the surface of the support part 75a facing the portable terminal 100, there is provided the near field communication tag 6. The near field communication tag 6 is arranged at such at position that the near field communication tag 6 can communicate with the communication unit 14 of the portable terminal 100 installed on the portable terminal holding unit 7.

According to this configuration, the first arm 72 is configured to adjust the mounting angle to the installation part 70 while the second arm 74 is configured to adjust the angle defined by the first arm 72 and the second arm 74. Thereby, the user can manually adjust the position of the display 110 of the portable terminal 100 in order to preferably see the virtual image Iv. Generally, the display position and the size of the virtual image Iv depend on the distance between the combiner 5 and the display 110. Thus, the configuration enables the user to preferably adjust the display position and the size of the virtual image Iv by adjusting the distance from the holder 75 and the portable terminal 100 to the combiner 5.

Preferably, the holder 75 holds the portable terminal 100 in such a state that the normal line (see arrow 28 in FIG. 4) of the display 110 passes above the center point (see dashed circle 29 in FIG. 4) of the reflection surface of the combiner 5. This can prevent the holder 75 and the portable terminal 100 from sticking out towards the head of the user and can produce enough clearance around the head.

The second arm 74 is configured to rotate by approximately 180 degree with respect to the first arm 72 towards the direction indicated by the arrow 21x in FIG. 4. Thereby, the holder 75 holds the display 110 of the portable terminal 100 while directing it to the eye point Pe. This explanation will be given with reference to FIG. 6.

Figure 6:
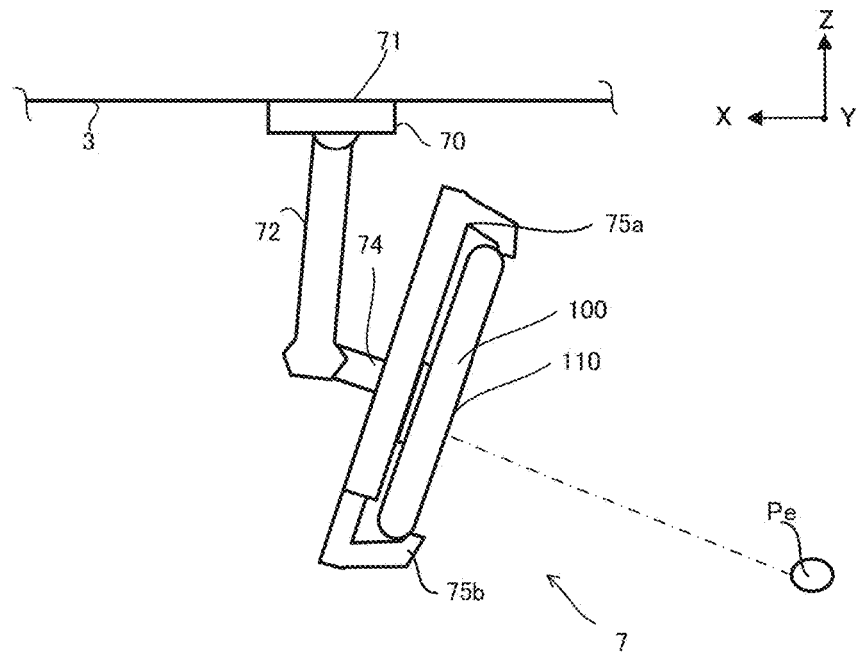
FIG. 6 is a side view of the portable terminal held by a portable terminal holding unit when the holder 75 is inverted.

FIG. 6 is a side view of the portable terminal 100 held by the portable terminal holding unit 7 in the state that the holder 75 in FIG. 4 is inversed. As illustrated in FIG. 6, in this case, the display 110 of the portable terminal 100 is fixed to be directed to the eye point Pe. Thus, in this state, the user can operate the portable terminal 100 installed on the portable terminal holding unit 7 while looking at the display 110.

Next, a description will be given of the de-installation of the portable terminal 100 from the portable terminal holding unit 7 with reference to FIG. 7.

Figure 7:
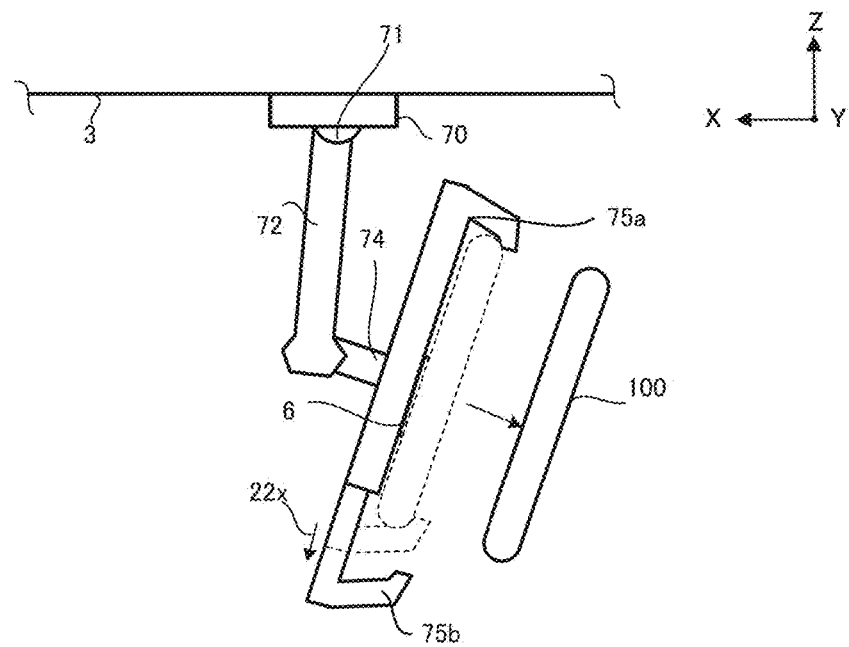
FIG. 7 illustrates a state before and after removing the portable terminal.

FIG. 7 illustrates the state before and after removing the portable terminal 100 by sliding the moving part 75b of the holder 75 in the state of FIG. 6. In FIG. 7, the moving part 75b and the portable terminal 100 before the de-installation of the portable terminal 100 is indicated by the dashed line. As illustrated in FIG. 7, when removing the portable terminal 100, the user slides the moving part 75b in the direction (see arrow 22x) that it moves farther away from the support part 75a. Thereby, it is possible to preferably remove the portable terminal 100 from the holder 75.

[Display Control Method]

Next, a description will be given of the display control method executed by the control unit 17 of the portable terminal 100. By executing a predetermined application for displaying the guide image Im, the control unit 17 determines the display mode of the guide image Im based on the type information Ik sent from the near field communication tag 6.

The examples of the type information Ik herein include information indicating the presence/absence of the necessity of inversing the guide image Im, information indicating in which state, the vertically long state or the horizontally long state, the portable terminal 100 is held, information on the size of the combiner 5, information on the distance between the combiner 5 and the portable terminal holding unit 7, information on the angle at which the portable terminal 100 is set with respect to the combiner 5, information on the size of the portable terminal 100 which the portable terminal holding unit 7 can hold, and information on the curvature of the combiner 5. It is noted that such a value that can be changed by user operation (e.g., the distance between the combiner 5 and the portable terminal holding unit 7 and the angle at which the portable terminal 100 is set with respect to the combiner 5) is determined to a standard value in case of normal use.

On the basis of the type information Ik, the control unit 17 determines the presence/absence of the necessity of inverting the guide image Im, the direction of the guide image Im, the size of the guide image Im, the display position of the guide image Im on the display 110 and the ratio (i.e., aspect ratio) of expansion and contraction of the guide image Im in the vertical and the horizontal directions. The concrete example thereof will be explained below with reference to FIGS. 8A and 8B.

Figure 8A:
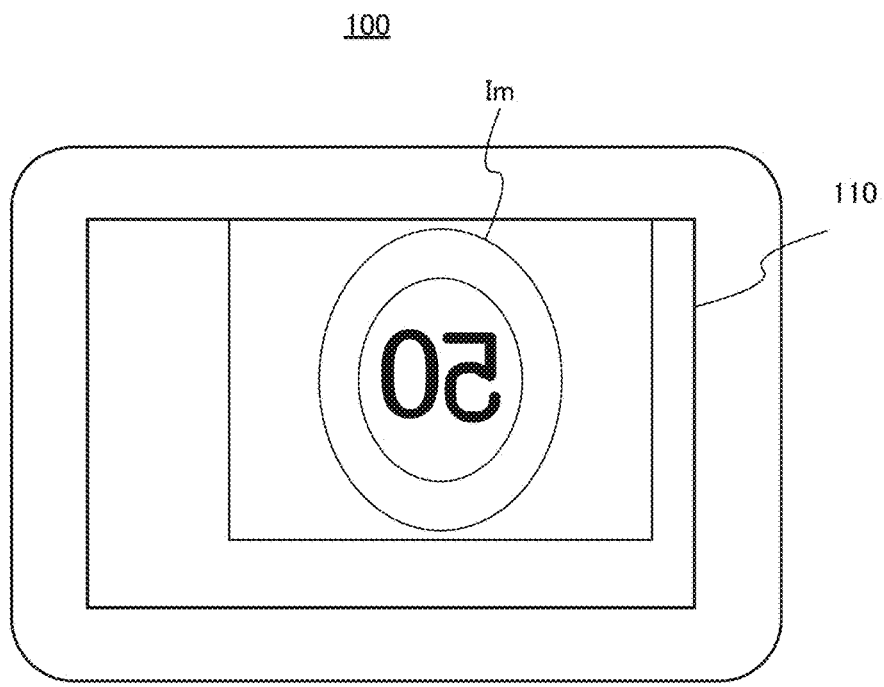
FIG. 8A is a front view of the portable terminal displaying a guide image in accordance with type information.
Figure 8B:
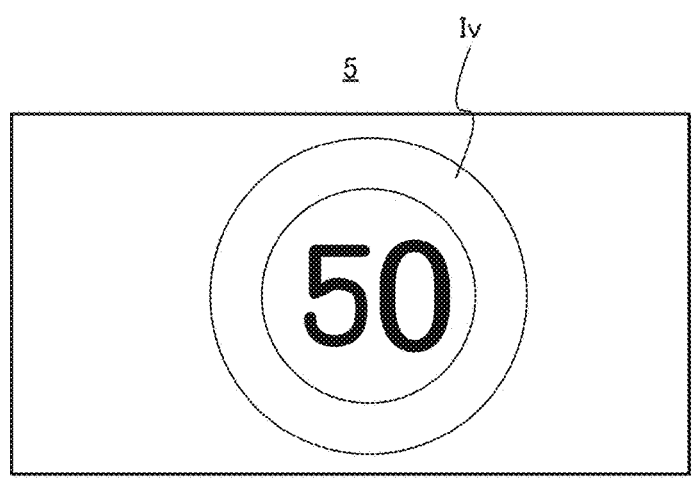
FIG. 8B illustrates a virtual image seen by a user through a combiner.

FIG. 8A is a front view of the portable terminal 100 displaying the guide image Im, and FIG. 8B illustrates the virtual image Iv seen by the user through the combiner 5 in the case of FIG. 8A.

According to the example illustrated in FIGS. 8A and 8B, on the basis of the type information Ik sent from the near field communication tag 6, the control unit 17 recognizes that the virtual image Iv seen through the combiner 5 is supposed to be displayed in a state that it is horizontally inverted with respect to the guide image Im. Thus, in this case, as illustrated in FIG. 8A, the control unit 17 horizontally inverts the guide image Im and displays the guide image Im on the display 110. By recognizing the presence/absence of the necessity of inverting the guide image Im based on the type information Ik in this way, the control unit 17 can let the user properly recognize the virtual image Iv.

Additionally, on the basis of the type information Ik, the control unit 17 recognizes in which state, the vertically long state or the horizontally long state, the display 110 is held, and determines the direction of the guide image Im in accordance with the recognition result. Concretely, when the portable terminal 100 is held in the vertically long state, the control unit 17 matches the vertical direction of the guide image Im to the longitudinal direction of the display 110. In contrast, when the portable terminal 100 is held in the horizontally long state, the control unit 17 matches the vertical direction of the guide image Im to the short direction of the display 110. It is noted that the control unit 17 may determine the direction of the guide image Im based on the output of the inclination sensing unit 16 instead of the type information Ik.

The control unit 17 also determines the size of the guide image Im on the display 110 based on the size information of the combiner 5 included in the type information Ik and the size information of the display 110 stored in the storage unit 13. For example, in this case, the storage unit 13 stores in advance a map indicating a proper size of the guide image Im with respect to each possible combination of the size of the combiner 5 and the size of the display 110, and the control unit 17 determines the size of the guide image Im with reference to the above-mentioned map. In the case of the example illustrated in FIGS. 8A and 8B, the control unit 17 determines that the whole guide image Im is not projected onto the combiner 5 (i.e., a part of the guide image Im deviates from the combiner 5) when the guide image Im is displayed on the whole area of the display 110. Then, the control unit 17 minifies the size of the guide image Im by a predetermined ratio. Thereby, the control unit 17 can preferably let the user visually recognize the whole guide image Im as the virtual image Iv.

The control unit 17 also determines the display position of the guide image Im on the display 110 on the basis of the type information Ik indicating the angle at which the portable terminal 100 is set with respect to the combiner 5. For example, in this case, the storage unit 13 stores in advance a map indicating a proper display position of the guide image Im with respect to each possible angle at which the portable terminal 100 is set with respect to the combiner 5. Then, the control unit 17 determines the display position of the guide image Im with reference to the map. In the case of the example illustrated in FIGS. 8A and 8B, the control unit 17 determines that the virtual image Iv deviates from the center of the combiner 5 towards the bottom left when the guide image Im is displayed at the center of the display 110. Thus, the control unit 17 shifts the guide image Im towards the top right in advance. Thereby, the control unit 17 can preferably display the virtual image Iv at the center position of the combiner 5.

In a similar way, the control unit 17 determines the aspect ratio of the guide image Im based on the type information Ik. For example, in this case, the storage unit 13 stores in advance a map indicating a proper aspect ratio of the guide image Im with respect to each possible setting angle of the portable terminal 100 included in the type information Ik. Then, the control unit 17 determines the aspect ratio of the guide image Im with reference to the map. In the case of the example illustrated in FIGS. 8A and 8B, on the basis of the type information Ik, the control unit 17 recognizes that the virtual image Iv to be displayed is supposed to vertically shrink from the guide image Im by a predetermined ratio, and therefore displays the guide image Im based on an aspect ratio that is a vertically-longer ratio than a normal aspect ratio. Thereby, the control unit 17 can let the user visually recognize the virtual image Iv at a proper aspect ratio.

Preferably, the control unit 17 may change the display mode of the guide image Im based on the input from the input unit 12. Generally, there is a user that cannot properly see the virtual image Iv even when the guide image Im is corrected in the above way based on the type information Ik. In consideration of the above fact, the control unit 17 accepts the input for correcting the display position and/or the aspect ratio of the guide image Im from the input unit 12 thereby to change the display mode of the guide image Im based on the input. In this way, the control unit 17 can preferably adjust the display mode of the virtual image Iv in accordance with the preference of the user.

As mentioned above, the virtual image display device 200 according to the first embodiment is provided with the portable terminal holding unit 7, the combiner 5 and the base unit 3. The portable terminal holding unit 7 detachably holds a portable terminal 100 equipped with a display 110 for displaying a guide image Im. The combiner 5 reflects light of the guide image Im displayed by the portable terminal 100 to let an observer visually recognize the image as a virtual image Iv overlapping with the front scenery. The base unit 3 is connected to the portable terminal holding unit 7 and the combiner 5. In this way, the virtual image display device 200 detachably holds the portable terminal 100 and uses the portable terminal 100 as a light source. Thus, the virtual image display device 200 can preferably let the user visually recognize the virtual image Iv by using the portable terminal 100 of the user.

<Second Embodiment>

According to the second embodiment, in addition to the display control of the guide image Im according to the first embodiment, the control unit 17 preferably performs the keystone (trapezoidal distortion) correction of the guide image Im. Thereby, as an area of the display 110 is close to the combiner 5, the control unit 17 minifies the image to be displayed on the area.

Figure 9:
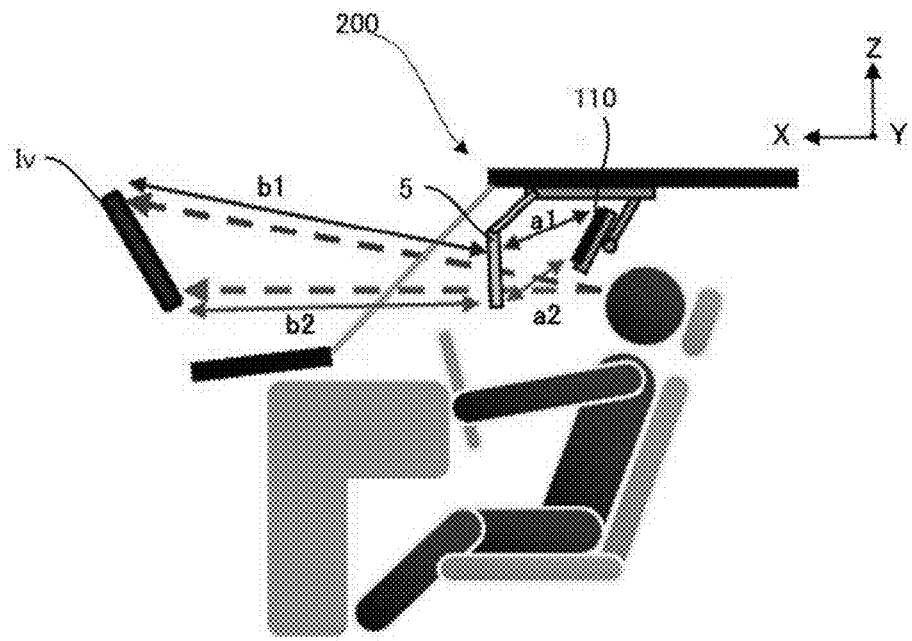
FIG. 9 is a side view of the virtual image display system illustrating a positional relationship among the display, the combiner and the virtual image.

FIG. 9 is a side view of the virtual image display system illustrating the positional relationship among the display 110, the combiner 5 and the virtual image Iv. Hereinafter the portion of the guide image Im displayed on the top edge of the display 110 is referred to as "top edge image portion", and the portion of the guide image Im displayed on the bottom edge of the display 110 is referred to as "bottom edge image portion".

In the case of FIG. 9, the distance "a1" between the top edge image portion and the position of the combiner 5 onto which the top edge image portion is projected is longer than the distance "a2" between the bottom edge image portion and the position of the combiner 5 onto which the bottom edge image portion is projected. Thus, the distance "b1" between the position of the combiner 5 onto which the top edge image portion is projected and the forming position of the virtual image Iv corresponding to the top edge image portion is longer than the distance "b2" between the position of the combiner 5 onto which the bottom edge image portion is projected and the forming position of the virtual image Iv corresponding to the bottom edge image portion. As a result, regarding the display size, the part of the virtual image Iv corresponding to the bottom edge image portion becomes larger than the part of the virtual image Iv corresponding to the top edge image portion. Thus, when the rectangular guide image Im is displayed, the virtual image Iv is displayed in a trapezoidal shape whose top edge is short.

In consideration of the above-mentioned fact, according to the second embodiment, the control unit 17 displays the guide image Im so that as an area of the display 110 is close to the combiner 5, the image portion displayed on the area becomes small. Concretely, on the basis of the output of the inclination sensing unit 16, the control unit 17 recognizes the inclination of the display 110 with respect to the Z axis, and performs the keystone correction of the guide image Im in accordance with the recognized inclination of the display 110. In this case, for example, the control unit 17 performs the keystone correction of the guide image Im by referring to a map, stored on the storage unit 13 in advance, indicating a proper correction amount of the keystone correction of the guide image Im with respect to each possible inclination of the display 110. It is noted that the control unit 17 may calculate a relative inclination of the display 110 to the combiner 5 with reference to information on the inclination of the combiner 5 included in the type information Ik in addition to the inclination of the display 110 to perform the keystone correction of the guide image Im in accordance with the relative inclination.

Hereinafter, with reference to FIGS. 10 and 11, a supplemental explanation will be given of the relationship between the distances a1, a2 and the distances b1, b2 in FIG. 9.

Figure 10:
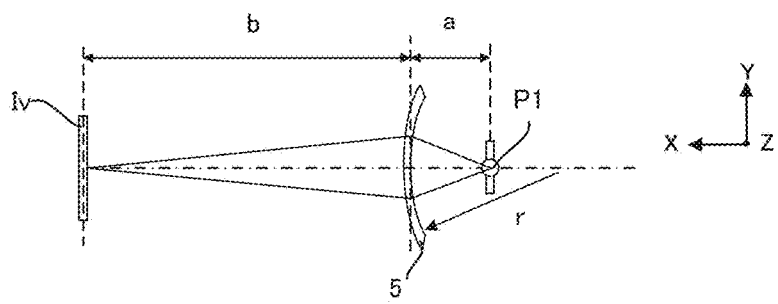
FIG. 10 schematically illustrates a positional relationship among an object point, the combiner, and the virtual image.

FIG. 10 schematically illustrates the positional relationship among the object point of an object, the combiner 5 and the virtual image Iv. Hereinafter, the distance between the object point P1 and the combiner 5 is referred to as "a", the distance between the virtual image Iv and the combiner 5 is referred to as "b", and the curvature radius of the reflection surface of the combiner 5 is referred to as "r".

In this case, on the basis of the image formation formula, the distances "a", "b" and the focal length "f" have a relationship defined by the following equation (1).

$$1/a + 1/(-b) = 1/f \qquad (1)$$

It is noted that the focal length "f" of the reflection surface of the combiner 5 is equal to a half of the curvature radius "r" of the reflection surface of the combiner 5 as indicated by the following equation (2).

$$f = r/2 \qquad (2)$$

According to the equations (1) and (2), provided that the curvature radius "r" of the reflection surface of the combiner 5 is constant, the distance "b" between the combiner 5 and the virtual image Iv varies depending on the distance "a" between the combiner 5 and the object point P1.

Figure 11:
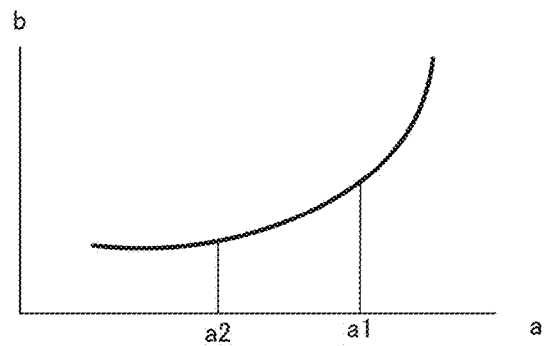
FIG. 11 illustrates a graph indicating a relationship between distance "a" and distance "b" in a case that the curvature radius of the reflection surface of the combiner is constant.

FIG. 11 illustrates a graph indicating the relationship between the distance "a" and the distance "b" in the case that the curvature radius "r" of the reflection surface of the combiner 5 is constant. As illustrated in FIG. 11, when the curvature radius "r" of the reflection surface of the combiner 5 is constant, the longer the distance "a" between the combiner 5 and the object point P1 is, the longer the distance "b" between the combiner 5 and the virtual image Iv becomes. The distances a1 and a2 in FIG. 9 correspond to the distance "a" in FIG. 10, and the distances b1 and b2 correspond to the distance "b" in FIG. 10. Since the distance a2 is shorter than the distance a1, the distance b2 corresponding to the bottom edge image portion in FIG. 9 is shorter than the distance b1 corresponding to the top edge image portion.

In this way, when the portable terminal 100 is held in the state that the display 110 is inclined to be directed to a higher point than the center point of the combiner 5, the portion of the virtual image Iv corresponding to the bottom edge image portion is displayed so that it is closer and larger than the portion of the virtual image Iv corresponding to the top edge image portion. Thus, in this case, the control unit 17 performs the keystone correction of the guide image Im so that the display width of the guide image Im gradually becomes narrower as the position is closer to the bottom edge and farther from the top edge of the guide image Im. Thereby, the control unit 17 can let the user preferably see the virtual image Iv.

<Third Embodiment>

According to the third embodiment, instead of or in addition to the second embodiment, the combiner 5 of the virtual image display device 200 has a concave reflection surface whose curvature at a position gradually becomes large as the position is close to the bottom edge and far from the top edge. Thereby, the virtual image display device 200 prevents the virtual image Iv from the trapezoidal distortion while letting the whole virtual image Iv be seen at a constant distance from the eye point Pe.

Figure 12:
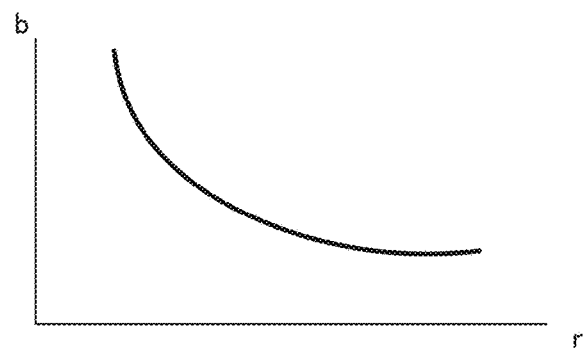
FIG. 12 illustrates a graph indicating a relationship between the distance "b" and the curvature radius r of the combiner in a case that the distance "a" is constant.

FIG. 12 illustrates a graph indicating the relationship between the distance "b" and the curvature radius "r" of the combiner 5 in the case that the distance "a" is constant. As illustrated in FIG. 12, when the distance "a" is constant, the distance "b" is negatively correlated with the curvature radius "r". Thus, according to the third embodiment, the curvature radius "r" of the reflection surface of the combiner 5 gradually becomes small as the position is close to the bottom edge and far from the top edge in order to compensate for the distance "b" being shorter and shorter towards the downside of the combiner 5 due to the inclination of the portable terminal 100 to the combiner 5. Thereby, it is possible to let the virtual image Iv be seen so that the distance from the eye point Pe to each position of the whole virtual image Iv is equal.

Next, the effect of the third embodiment will be described with reference to FIG. 13.

Figure 13:
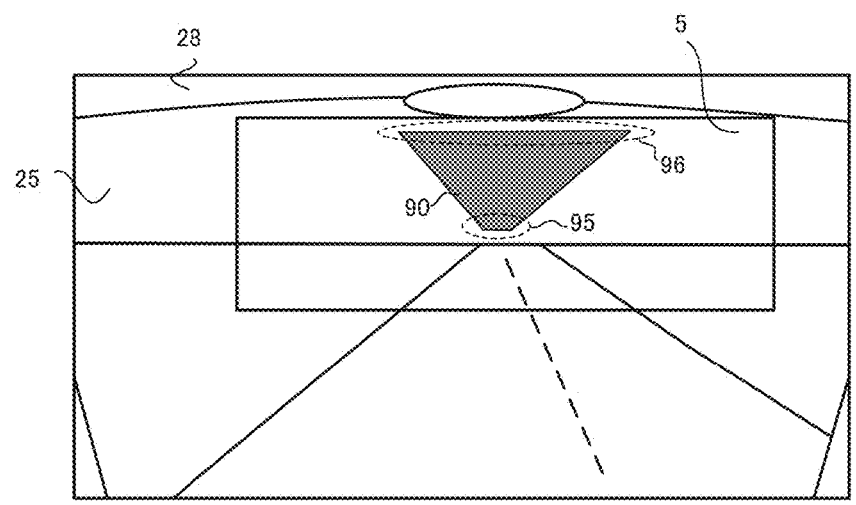
FIG. 13 illustrates an example of eyesight of a driver including the combiner.

FIG. 13 illustrates an example of eyesight of the driver including the combiner 5. In the case of FIG. 13, the virtual image display system displays as the virtual image Iv the route image 90 indicating a route where the vehicle is supposed to run at the vertically inversed position of the road in the scenery corresponding to the route with respect to the horizon line.

In this case, the bottom edge image portion (see the dashed frame 95) of the route image 90 indicates the road portion at the position relatively far from the present position, and the top edge image portion (see the dashed frame 96) of the route image 90 indicates the road portion at the position relatively close to the present position. In contrast, as mentioned in FIG. 9, when the portable terminal 100 is directed to a position higher than the combiner 5, the distance b1 corresponding to the top edge image portion of the route image 90 is longer than the distance b2 corresponding to the bottom edge image portion of the route image 90. Thus, in this case, the top edge image portion of the route image 90 corresponding to the road closer to the present position is displayed at a position farther from the eye point Pe whereas the bottom edge image portion of the route image 90 corresponding to the road farther from the present position is displayed at a position closer to the eye point Pe. Thus, in this case, the virtual image Iv is displayed contrary to the proper distance sense of the virtual image Iv.

Above things considered, according to the third embodiment, the curvature radius "r" becomes gradually small as the position is close to the bottom edge and far from the top edge of the reflection surface of the combiner 5. Thereby, it is possible to prevent the distance "b" between the combiner 5 and the virtual image Iv from being shorter towards the downside of the combiner 5 due to the inclination of the portable terminal 100 to the combiner 5.

Preferably, in the case of FIG. 9, the curvature radius "r" of the reflection surface of the combiner 5 may be gradually small as the position is far from the top edge and close to the bottom edge so that the distance b1 between the portion of the combiner 5 corresponding to the top edge image portion and the virtual image Iv is shorter than the distance b2 between the portion of the combiner 5 corresponding to the bottom edge image portion and the virtual image Iv. Namely, in this case, beyond the decrease amount of the distance "b" between the combiner 5 and the virtual image Iv caused by the position of the combiner 5 getting close to the bottom due to the inclination of the portable terminal 100 to the combiner 5, the curvature variation of the reflection surface of the combiner 5 is determined to lengthen the distance "b" between the combiner 5 and the virtual image Iv as the position of the combiner 5 is close to the bottom. Thereby, it becomes possible to allow the user to realistically see the route image 90 in FIG. 13 by displaying the virtual image Iv so that the closer the position of the virtual image Iv is to the bottom portion, the farther the distance therefrom to the eye point Pe becomes.

In this case, the type information Ik may include information on the curvature of the combiner 5. In this case, on the basis of the information on the curvature of the combiner 5, the control unit 17 of the portable terminal 100 changes the display position on the display 110 so that an image corresponding to a position farther from the present position is projected onto a position of the combiner 5 at which the curvature radius "r" is smaller.

<Fourth Embodiment>

According to the fourth embodiment, in addition to any of the first to the third embodiments, the control unit 17 detects the inclination of the display 110 with respect to the horizontal direction and rotates the guide image Im against the inclination of the display 110 by the inclination amount. Thereby, the control unit 17 properly displays the virtual image Iv without the inclination of the virtual image Iv with respect to the horizontal direction even when the vehicle is running on a dirt road, for example.

Generally, when the road where the vehicle is running is in a bad condition, the virtual image display device 200 has a tendency to lean towards right or left (i.e., rolling direction) with respect to the horizontal direction together with the vehicle. In this case, the user unconsciously tends to try to correct the eye direction by moving the upper body because of a human property. As a result, the user visually recognizes the virtual image Iv leant to the right or the left with respect to the horizontal direction. The above things considered, the control unit 17 detects the rolling inclination of the display 110 with respect to the horizontal direction based on the output of the inclination sensing unit 16 thereby to rotate the guide image Im against the inclination by the inclination amount.

Figure 14A:
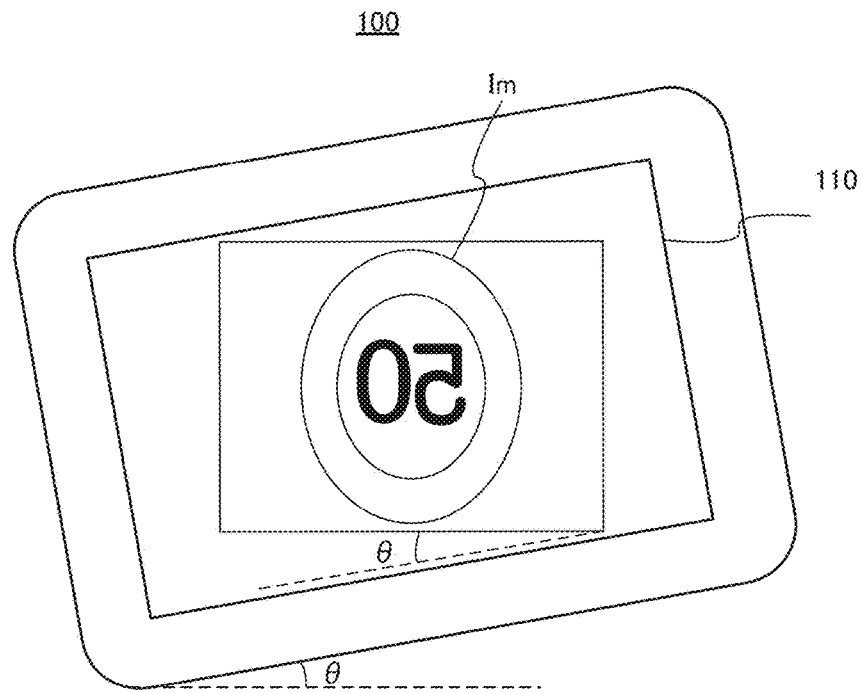
FIG. 14A is a front view of the portable terminal in a state that the vehicle is leant in the counterclockwise direction by a predetermined angle with respect to the horizontal direction.
Figure 14B:
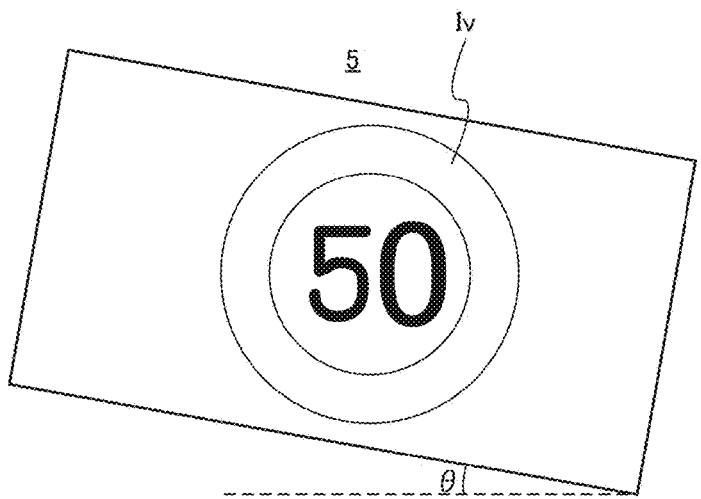
FIG. 14B is a display example of the virtual image seen through the combiner.

FIG. 14A is a front view of the portable terminal 100 leant towards the counterclockwise direction by the angle "θ" with respect to the horizontal direction. FIG. 14B is a display example of the virtual image Iv seen through the combiner 5.

As illustrated in FIG. 14A, in this case, the display 110 is leant in the counterclockwise direction by the angle θ with respect to the horizontal direction while the combiner 5 is leant in the clockwise direction by the angle θ as illustrated in FIG. 14B. In this case, on the basis of the output of the inclination sensing unit 16, the control unit 17 detects that the display 110 is leant in the counterclockwise direction by the angle θ with respect to the horizontal direction. Thus, the control unit 17 rotates the guide image Im on the display 110 in the clockwise direction opposite to the counterclockwise direction by the angle θ. Thereby, as illustrated in FIG. 14A, the side direction of the guide image Im becomes parallel to the horizontal direction. As a result, the virtual image Iv is displayed without leaning with respect to the horizontal direction as illustrated in FIG. 14B.

In this way, according to the fourth embodiment, the control unit 17 can let the user properly see the virtual image Iv without any inclination of the virtual image Iv even when the vehicle is running on a dirt road.

The configuration according to the fourth embodiment also enables the control unit 17 to let the user properly see the virtual image Iv without any inclination of the virtual image Iv even when the virtual image display device 200 cannot be horizontally set to the vehicle under the restriction due to the vehicle shape.

<Fifth Embodiment>

According to the fifth embodiment, the portable terminal 100 is set in substantially parallel with the base unit 3. This preferably ensures enough clearance around the head of the driver.

Figure 15:
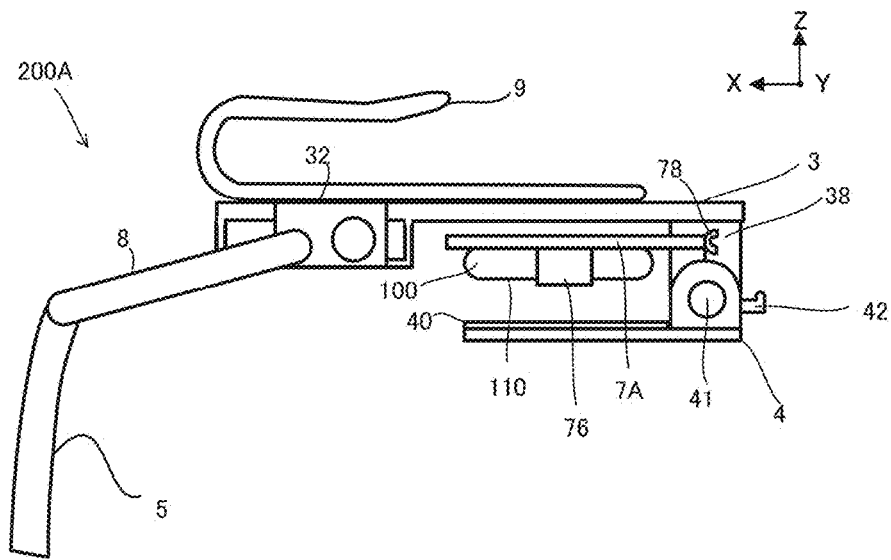
FIG. 15 is a side view of a virtual image display device in a stored state according to a fifth embodiment.
Figure 16:
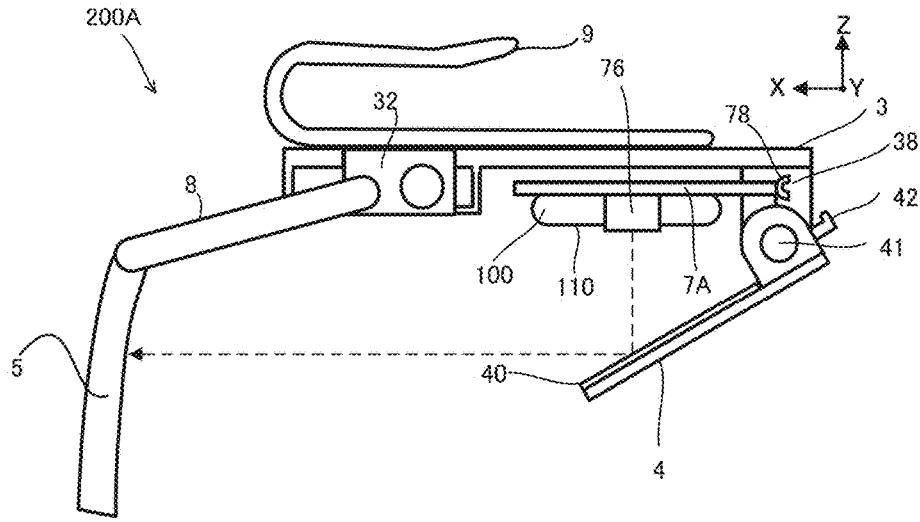
FIG. 16 is a side view of a virtual image display device displaying the virtual image according to the fifth embodiment.

FIG. 15 is a side view of a virtual image display device 200A in the stored state according to the fifth embodiment, and FIG. 16 is a side view of a virtual image display device 200A displaying the virtual image Iv.

As illustrated in FIG. 15, the virtual image display device 200A includes the base unit 3, the reflection unit 4, the combiner 5, the portable terminal holding unit 7A, the arms 8, and the clip unit 9. Hereinafter, components of the virtual image display device 200A same as the virtual image display device 200 according to the first embodiment are provided with the same reference numbers and the explanation thereof will be omitted. The near field communication tag 6 which is not shown herein is set to such a position that it can communicate with the communication unit 14 of the portable terminal 100 installed on the portable terminal holding unit 7A.

The reflection unit 4 has a mirror 40 for reflecting the light emitted from the display 110 to the combiner 5. The reflection unit 4 is capable of rotating around the Y axis on the rotation axis part 41. The rotation axis part 41 is supported by the supporting part 38 that is provided on the surface of the base unit 3 opposite to the surface contacting the clip unit 9. The reflection unit 4 also has the stopper 42 for fixing the reflection unit 4 to the portable terminal holding unit 7A. The mirror 40 is an example of "the reflection unit" according to the present invention.

The portable terminal holding unit 7A holds the portable terminal 100 in approximately parallel with the base unit 3. The portable terminal holding unit 7A is equipped with a pair of arms 76 which sandwich and hold the portable terminal 100 from both sides of the portable terminal 100. The portable terminal holding unit 7A also includes a rotating shaft rotatably fixed at the supporting part 38 which is not shown, and the portable terminal holding unit 7A is capable of rotating from the state of FIG. 15 towards the counterclockwise direction up to approximately 90°. The portable terminal holding unit 7A includes the fitting unit 78 capable of being fitted to the stopper 42. The fitting unit 78 is fitted to the stopper 42 when the top edge of the stopper 42 gets contact with it by a predetermined pressure. In a state that the fitting unit 78 and the stopper 42 are fitted together, the stopper 42 is detached from the fitting unit 78 when a predetermined pressure for detaching the stopper 42 is applied to the stopper 42.

As illustrated in FIG. 15, when the virtual image display device 200A is in the stored state, the reflection unit 4 is rotated to such a position that the mirror 40 is in substantially parallel with the base unit 3. Thereby, it is possible to ensure the clearance around the head when the virtual image display device 200A is not used.

In contrast, when the virtual image display device 200A is set up, the reflection unit 4 is rotated from the state of FIG. 15 towards the counterclockwise direction by a predetermined angle. Thereby, as illustrated in FIG. 16, the mirror 40 is fixed to face the display 110 and to reflect the light of the display 110 to the combiner 5. In this way, the virtual image display device 200A can let the user see the virtual image Iv by projecting the display light of the portable terminal 100 provided in substantially parallel with the base unit 3 onto the combiner 5.

As illustrated in FIG. 16, after reflecting the guide image Im by the mirror 40, the virtual image display device 200A reflects the reflection light by the combiner 5 thereby to let the light for displaying the guide image Im enter the eye point Pe. Thus, in this case, unlike in the case of virtual image display device 200 according to the first to the fourth embodiments, it is not necessary for the control unit 17 to horizontally invert the guide image Im before displaying it on the display 110. In this case, the type information Ik acquired from the near field communication tag 6 which is not shown includes information indicating needlessness to invert the guide image Im, and the control unit 17 of the portable terminal 100 displays on the display 110 the guide image Im without horizontally inversing the guide image Im based on the type information Ik.

Next, with reference to FIGS. 17A and 17B, a description will be given of a case that the user operates the portable terminal 100 in the installation state that the portable terminal 100 is held by the portable terminal holding unit 7A.

Figure 17A:
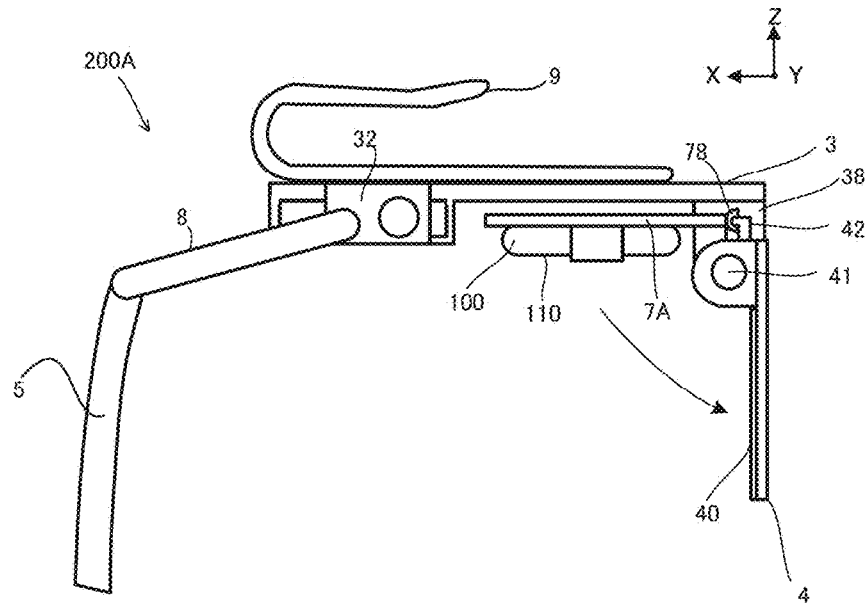
FIG. 17A is a side view of the virtual image display device in a case that a reflection unit is rotated in the counterclockwise direction by approximately 90°.

FIG. 17A is a side view of the virtual image display device 200A in a case that the reflection unit 4 is rotated in the counterclockwise direction from the state of FIG. 15 by approximately 90°. In this case, as illustrated in FIG. 17A, the stopper 42 is in contact with and fitted to the fitting unit 78. In this state, the reflection unit 4 and the portable terminal holding unit 7A are capable of rotating together.

Figure 17B:
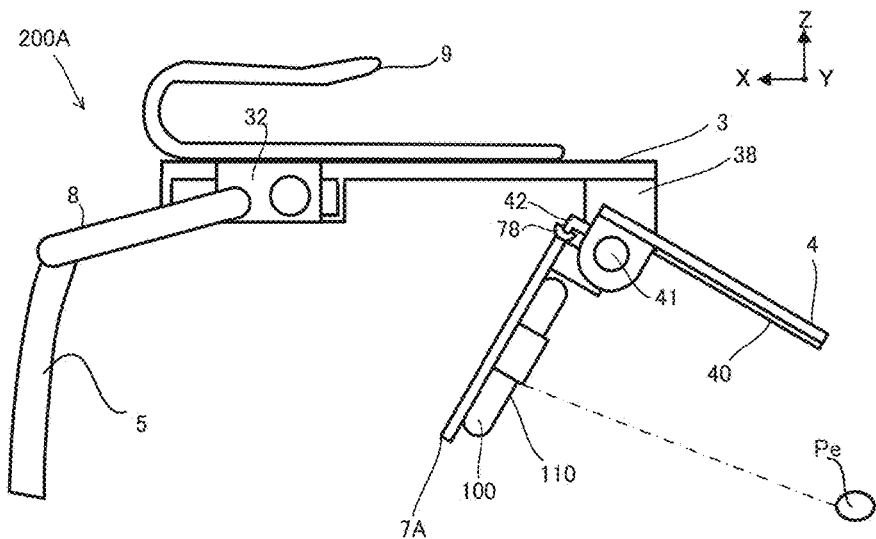
FIG. 17B is a side view of the virtual image display device after rotating the reflection unit and the portable terminal holding unit in the counterclockwise direction by approximately 45°.

FIG. 17B is a side view of the virtual image display device 200A after rotating the reflection unit 4 and the portable terminal holding unit 7A in the counterclockwise direction from the state of the FIG. 17A by approximately 45°. In this case, since the stopper 42 is fitted to the fitting unit 78, the reflection unit 4 and the portable terminal holding unit 7A rotate from the state of FIG. 17A by the same angle. In the state of FIG. 17B, the portable terminal holding unit 7A is locked to the supporting part 38 of the base unit 3. Thus, in this case, the user can preferably operate the portable terminal 100 while facing and looking at the display 110.

It is noted that the virtual image display device 200A according to the fifth embodiment may include a GPS receiver thereby to wirelessly send the measured information to the portable terminal 100 in consideration of the fact that the portable terminal 100 is placed below the ceiling board 28. Thereby, the portable terminal 100 can preferably obtain the present position information even when the GPS receiver 15 of the portable terminal 100 does not work. The receiving antenna for receiving radio waves from GPS satellites may be provided on the dashboard of the vehicle for example, and it is connected to the GPS receiver of the virtual image display device 200A via a cable. In another example, the virtual image display device 200A may be capable of stand-alone measurement with various kinds of sensors such as a gyro sensor, an acceleration sensor and a distance sensor in addition to the GPS receiver. The virtual image display device 200A may be configured to obtain various kind of vehicle information from the vehicle such as vehicle speed pulses. These modifications can be applied not only to the fifth embodiment but also to the first to the fourth embodiments. By sending the obtained information to the portable terminal 100, the virtual image display device 200 can preferably let the portable terminal 100 perform the route navigation and the like.

<Modification>

Hereinafter, preferred modifications of the above-mentioned embodiment will be described below. Each modification mentioned later can be applied to the above-mentioned embodiment in combination.

(First Modification)

In the case of the first to the fourth embodiments, the control unit 17 may determine whether the display 110 is directed to the combiner 5 or to the eye point Pe thereby to determine whether or not to horizontally invert the guide image Im based on the determination result. Concretely, if the display 110 is directed to the combiner 5 as illustrated in FIG. 4, the control unit 17 horizontally inverts the guide image Im. In contrast, if the display 110 is directed to the eye point Pe as illustrated in FIG. 6, the control unit 17 does not invert the guide image Im.

A description will be given of concrete examples of the determination method of the direction of the display 110. Hereinafter, it is assumed that the inclination sensing unit 16 is an acceleration sensor configured to detect the acceleration in the thickness direction of the portable terminal 100.

First, the control unit 17 monitors the output of the inclination sensing unit 16 after determining that the vehicle is accelerating based on the output of the GPS receiver 15. Concretely, the control unit recognizes that the vehicle is advancing if the vehicle moves at a velocity faster than a predetermined velocity (e.g., 20 km/h), and monitors the variation of the vehicle speed. Thereafter, when determining that the vehicle is advancing and accelerating, the control unit 17 monitors the output of the inclination sensing unit 16. Then, the control unit 17 determines whether the direction of the acceleration indicated by the output of the inclination sensing unit 16 is to the direction of the display or to the direction of the back surface 130. If the acceleration indicated by the output of the inclination sensing unit 16 is an acceleration whose positive direction is towards the display 110, the control unit 17 determines that the display 110 is directed to the combiner 5. In contrast, if the acceleration indicated by the output of the inclination sensing unit 16 is an acceleration whose negative direction is towards the display 110, the control unit 17 determines that the display 110 is directed to the eye point Pe. Similarly, when determining that the vehicle is decelerating towards the front direction and that the acceleration indicated by the output of the inclination sensing unit 16 is an acceleration whose negative direction is towards the display 110, the control unit 17 determines that the display 110 is directed to the combiner 5. Once the above-mentioned determination of the direction of the display 110 is made, the control unit 17 may recognize the necessity of switching the direction of the display 110 by determining whether or not the display 110 is horizontally inverted based on the inclination sensing unit 16 until the portable terminal 100 is detected to be detached from the portable terminal holding unit 7.

As an alternative example of the above-mentioned concrete example, the control unit 17 determines whether or not the face of the user is shown in an image generated by a camera of the portable terminal 100 which is not shown, and determines that the face of the user is directed to the side of the portable terminal 100 on which the camera is provided if the face of the user is shown in the image. For example, provided that the camera is provided on the side of the display 110 and that the face of the user is detected from the image, the control unit 17 recognizes that the display 110 is directed to the eye point Pe. It is noted that the control unit 17 may use various kinds of known facial recognition technologies when determining whether or not the face is shown in the image and whether or not the detected face coincides with the registered face of the user. Even in this case, the control unit 17 can preferably determine the direction of the display 110.

According to the first modification, by switching the horizontal inversion and non-inversion of the guide image Im, the control unit 17 can properly display the image on the display 110 even when the user operates the portable terminal 100 held by the virtual image display device 200.

(Second Modification)

Figure 18:
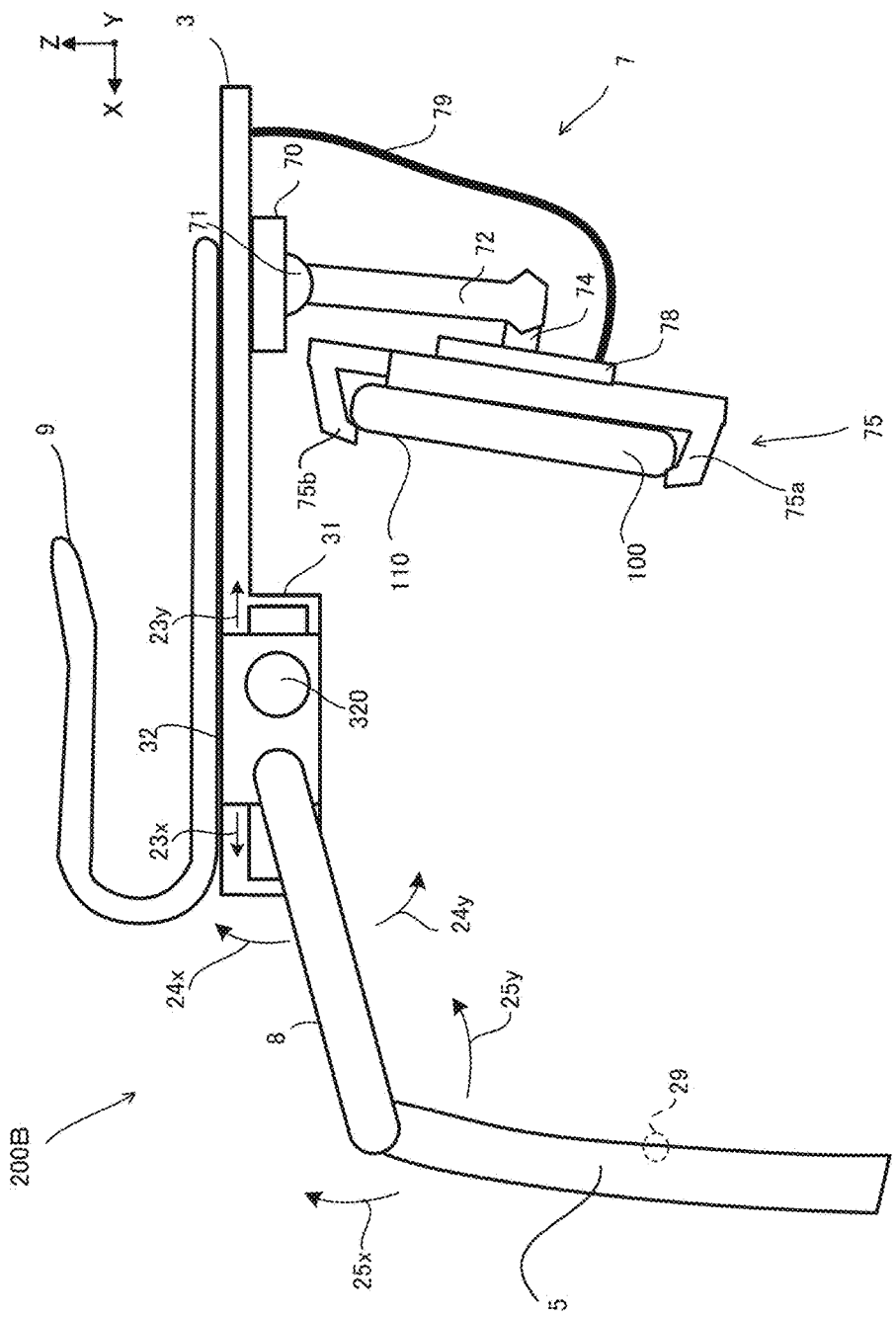
FIG. 18 is a side view of the virtual image display device according to a second modification.

According to the first embodiment, the control unit 17 detects that the portable terminal 100 has been installed on the portable terminal holding unit 7 by receiving a wireless signal including the type information Ik from the near field communication tag 6. Instead of or in addition to this, the control unit 17 may recognize that the portable terminal 100 has been installed on the portable terminal holding unit 7 and should invert the guide image Im by determining that a predetermined navigation application for displaying the guide image Im is running and that the portable terminal 100 is being charged, FIG. 18 is a side view of the virtual image display device 200B according to the second modification. As illustrated in FIG. 18, the virtual image display device 200B includes a battery charger unit 78 and a cable 79. The battery charger 78 is provided on the back surface of the holder 75 and charges the portable terminal 100 by receiving electric power from the cable 79 connected to the accessory socket. The battery charger 78 may be a wireless power feeding apparatus complying with the Qi standard for example. The battery charger 78 may be a power feeding connector for supplying electric power to the portable terminal 100 instead of the wireless power feeding apparatus. It is noted that the near field communication tag 6 which is not shown is provided at such a position that it can communicate with the communication unit 14 of the portable terminal 100 installed on the portable terminal holding unit 7.

In the case of FIG. 18, the portable terminal 100 is charged when it is installed on the virtual image display device 200B. Thus, the control unit 17 determines that the portable terminal 100 is installed on the portable terminal holding unit 7 if a predetermined navigation application for displaying the guide image Im is running and the portable terminal 100 is being charged.

(Third Modification)

The combiner 5 may includes a light shielding plate at a position where the plate shields the light coming against the direction in which the virtual image Iv is seen by the user. Thereby, it is possible to prevent the visibility of the virtual image Iv from deteriorating even when the natural light nearby is strong.

Figure 19:
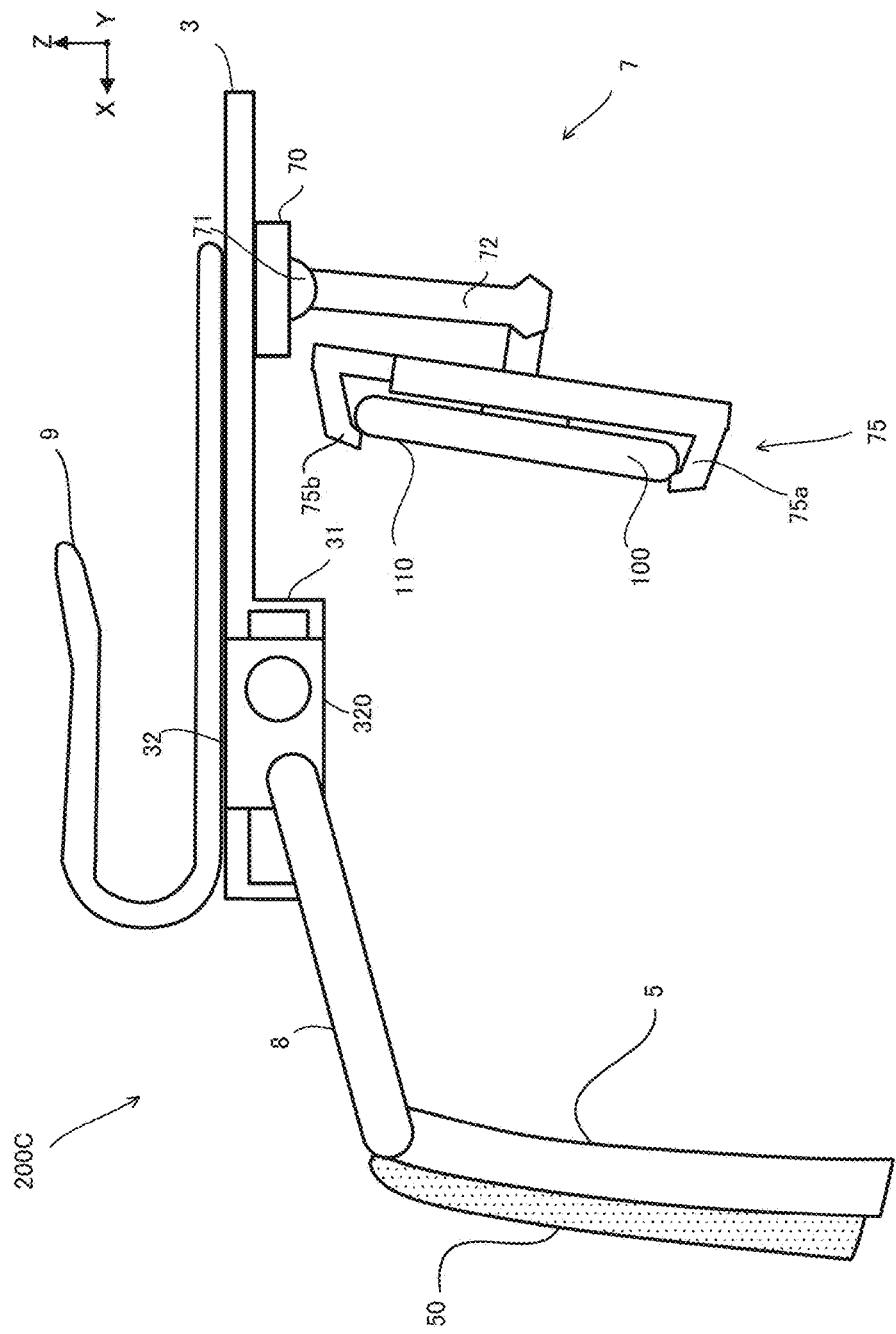
FIG. 19 is a side view of the virtual image display device according to a third modification.

FIG. 19 is a side view of the virtual image display device 200C according to the third modification. As illustrated in FIG. 19, the virtual image display device 200C has a shielding plate 50 overlapping with the surface of the combiner 5 opposite to the reflection surface. The shielding plate 50 shields all or a part of the light entering the combiner 5 against the direction in which the virtual image Iv is seen by the user. Thereby, the virtual image display device 200C can let the user properly see the virtual image Iv even when the brightness of the guide image Im is lower than the brightness of the natural light. In particular, since the virtual image display system according to any of the first to the fifth embodiments uses the guide image Im displayed on the display 110 of the portable terminal 100 as an intermediate image, it is hard to ensure a sufficient brightness. Thus, according to the third modification, it is possible to let the user preferably see the virtual image Iv.

It is noted that the shielding plate 50 is configured to open and close with respect to the combiner 5. In this case, for example, the shielding plate 50 is capable of rotating within the range from the position of FIG. 19 to the position along the arms 8, and is placed at the position along the arms 8 in the non-use state. Preferably, the control unit 17 may decrease the brightness of the guide image Im when detecting the close state of the shielding plate 50 to the combiner 5 based on the output from a sensor (not shown) sensing the opening and the closing of the shielding plate 50 to the combiner 5. Thereby, it is possible to preferably suppress the power consumption of the portable terminal 100. More preferably, the shielding plate 50 is controlled to open and close based on a control signal sent from the control unit 17, and the control unit 17 sends the shielding plate 50 a control signal for instructing the shielding plate 50 to close to the combiner 5 if the remaining capacity of the battery of the portable terminal 100 is equal to or lower than a predetermined amount. Thereby, it is possible to preferably suppress the power consumption of the portable terminal 100 when the battery of the portable terminal 100 is weakening.

(Fourth Modification)

In the case of FIG. 4, the installation part 70 of the portable terminal holding unit 7 may be configured to slide on the base unit 3 along the X axis direction. In this case, for example, on the base unit 3, there is provided a rail in order for the installation part 70 to slide, and the installation part 70 is slidably fitted to the rail. Such a configuration that the portable terminal holding unit 7 is configured to slide in the X axis direction enables the user to preferably adjust the clearance around the head and the distance between the display 110 and the combiner 5.

(Fifth Modification)

The virtual image display device 200 is attached to the sun visor 29. However, the attachment position of the virtual image display device 200 to which the present invention can be applied is not limited to the position. Instead, the virtual image display device 200 may be provided on or in the dashboard.

Figure 20:
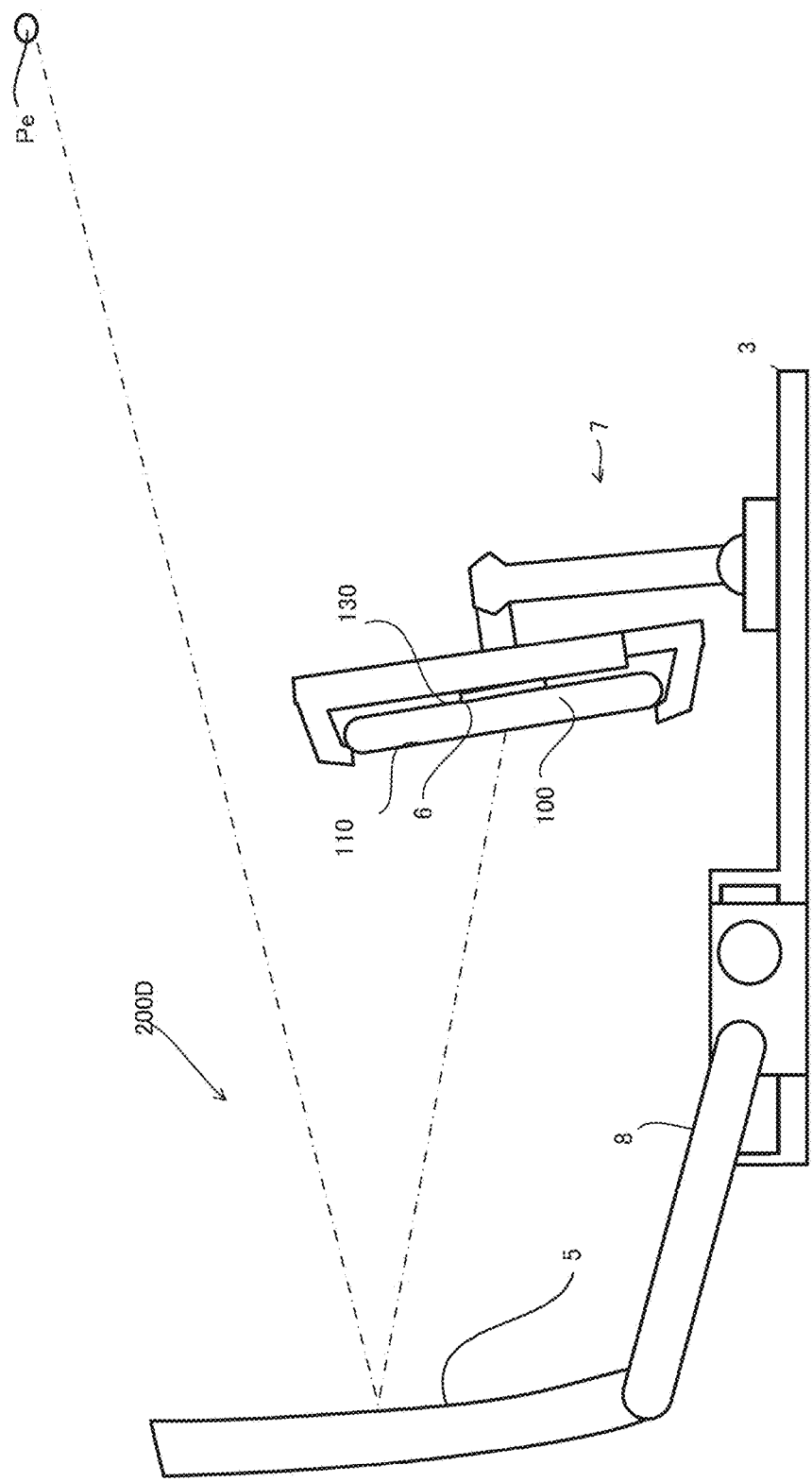
FIG. 20 is a side view of the virtual image display device provided on a dashboard.

FIG. 20 is a side view of the virtual image display device 200D provided on the dashboard. In case of FIG. 20, the virtual image display device 200D corresponds to the virtual image display device 200 according to the first embodiment vertically inverted except the clip unit 9. The base unit 3 is fixed on the dashboard. The portable terminal 100 is installed on the portable terminal holding unit 7 of the virtual image display device 200D and functions as the light source of the virtual image display system. In such a mode that the mounting position is the dashboard, the virtual image display device 200D can let the user properly see the virtual image Iv corresponding to the guide image Im outputted by the display 110 of the portable terminal 100.

In another example, the virtual image display device 200 may be attached to the ceiling board 28 instead of the sun visor 29. In this case, for example, instead of the clip unit 9, on the top surface of the base unit 3 of the virtual image display device 200, there is provided a member for fitting into an attachment hole (not shown) provided on the ceiling board 28 for mounting the sun visor 29.

(Seventh Modification)

The virtual image display device 200 may be configured to have a reflection mirror (not shown) which shields the natural light instead of the combiner 5. In this case, it is possible to let the user properly see the virtual image Iv even when the brightness of the guide image Im is lower than the brightness of the natural light.

(Eighth Modification)

According to the first to the fourth embodiments, the clip unit 9 of the virtual image display device 200 is attached to the base unit 3. Instead, the clip unit 9 and the base unit 3 are connected through a rotatable connection member.

Figure 21:
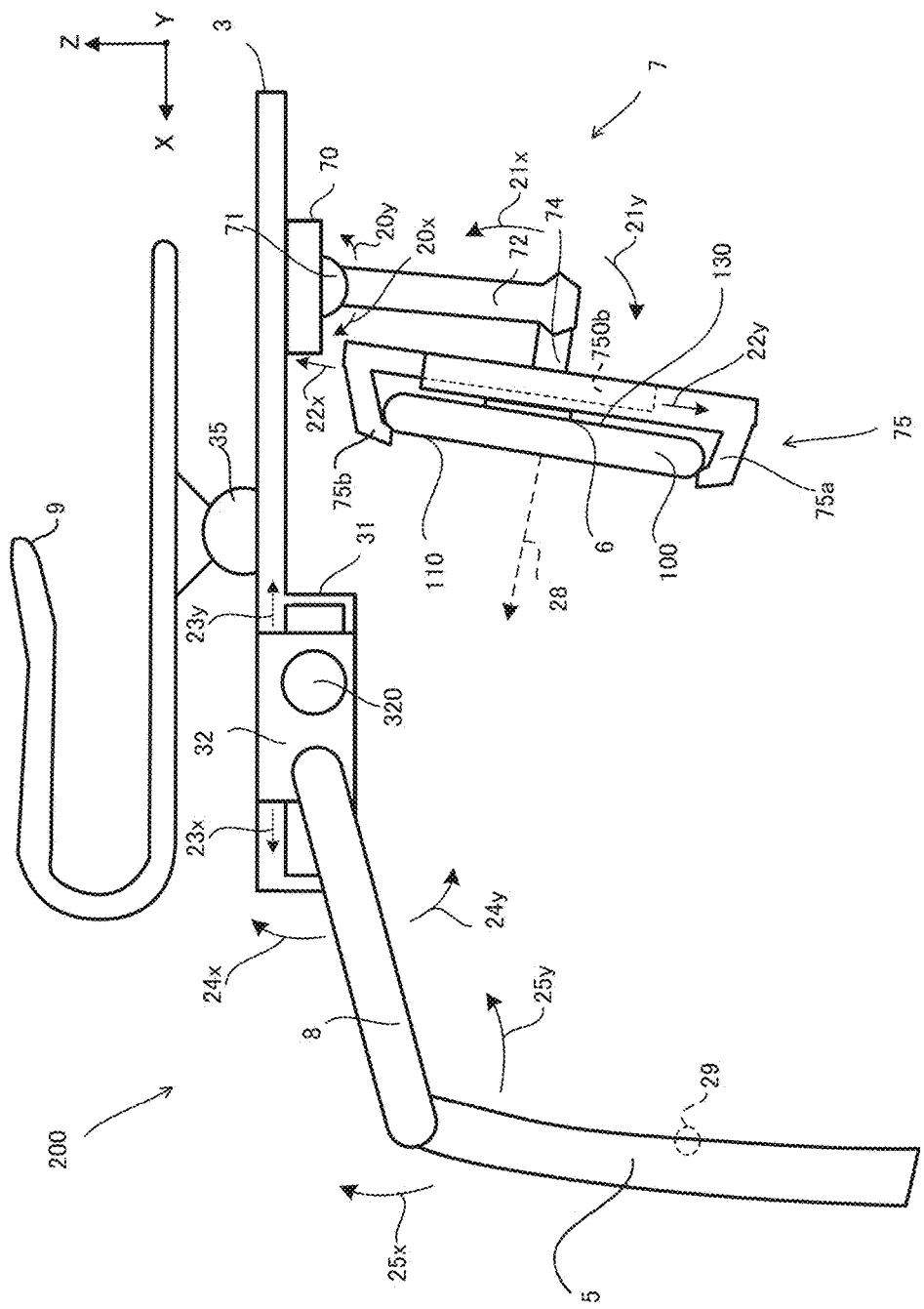
FIG. 21 is a side view of the virtual image display device according to an eighth modification.

FIG. 21 is a side view of the virtual image display device 200 according to the eighth modification. As illustrated in FIG. 21, the clip unit 9 is connected to the ball link 35 provided on the base unit 3. The ball link 35 rotatably holds the clip unit 9 so that the clip unit 9 can rotate with respect to the base unit 3. The ball link 35 is an example of "the connecting member" according to the present invention. According to such a configuration, by rotating the base unit 3 with respect to the clip unit 9, it is possible to properly set the virtual image display device 200 to a vehicle without any inclination of the combiner 5 even when the sun visor 29 of the vehicle is provided to be horizontally leant.

In another example, a rotatable connecting member may be provided to connect the base unit 3 to the member fitted into the attachment hole on the ceiling board 28 for setting the sun visor 29 according to fifth modification.

BRIEF DESCRIPTION OF REFERENCE NUMBERS

11 Output unit
12 Input unit
13 Storage unit
14 Communication unit
15 GPS receiver
16 Inclination sensing unit
17 Control unit
100 Portable terminal
110 Display
120 Touch panel
200, 200A to 200D Virtual image display device

The invention claimed is:

1. A virtual image display device, comprising:
a holding unit that detachably holds a portable terminal equipped with a display unit which displays an image; and
an optical element configured to reflect light of the image displayed by the display unit that permits an observer to visually recognize the image as a virtual image,
the holding unit having a near field wireless communication unit provided thereon for communicating with the portable terminal when the portable terminal is held by the holding unit, the near field wireless communication unit having information stored thereon and configured to transmit said information to the portable terminal, the information being configured so that the portable terminal, upon receipt of the information, determines a display mode of the image which the display unit displays.

2. The virtual image display device according to claim 1, wherein the information stored by the near field wireless communication unit causes the portable terminal, when received by the portable terminal, to determine whether or not to horizontally invert the image as a display mode of the image which the display unit displays.

3. The virtual image display device according to claim 1, wherein the near field wireless communication unit is an NFC tag.

4. The virtual image display device according to claim 1, further comprising:
an attachment unit that attaches to a part of a vehicle, and
a connecting unit that connects a main body to the attachment unit in a manner to be freely inclined, the main body including the holding unit and the optical element.

5. The virtual image display device according to claim 1, wherein the optical element has a reflective surface formed into a concave shape,
wherein the reflective surface reflects the light of the image,
wherein the reflective surface faces the display unit of the portable terminal held by the holding unit while being inclined with respect to the display unit,
wherein a curvature radius of a first edge of the reflective surface is smaller than a curvature radius of a second edge of the reflective surface, and
wherein a distance between the first edge and the display unit is longer than a distance between the second edge and the display unit.

6. A control method executed by a portable terminal equipped with a display unit which displays an image, the method comprising:
- a communication process of communicating information with a near field wireless communication unit in a state that the portable terminal is held by a holding unit of a virtual image display device, the near field wireless communication unit being provided on the holding unit and external to the portable terminal, the holding unit detachably holding the portable terminal, the virtual image display device including the holding unit and an optical element, the optical element reflecting light of the image in a manner such to permit an observer to visually recognize the image as a virtual image; and
- a display control process of determining a display mode of the image to be displayed on the display unit in accordance with the information received from the near field wireless communication unit.

7. The control method according to claim 6, wherein the display control process determines whether or not to horizontally invert the image as a display mode of the image to be displayed on the display unit.

8. A non-transitory computer readable medium including computer-executable instructions recorded thereon, the instructions being such to cause the computer, upon execution by the computer, to function as:
- a communication unit that communicates information with a near field wireless communication unit in a state that a portable terminal is held by a holding unit of a virtual image display device, the near field wireless communication unit being provided on the holding unit and separate from the portable terminal, the holding unit detachably holding the portable terminal, the virtual image display device including the holding unit and an optical element, the optical element reflecting light of the image in a manner that permits an observer to virtually recognize the image as a virtual image; and
- a display control unit that determines a display mode of the image to be displayed on the display unit in accordance with the information received from the near field wireless communication unit.

9. The non-transitory computer readable medium according to claim 8,
wherein the display control unit determines whether or not to horizontally invert the image as a display mode of the image to be displayed on the display unit.

10. A near field wireless communication tag, comprising:
a storage unit that stores an information that is received by a portable terminal detachably held by a virtual image display device, the virtual image display device configured to reflect light of an image displayed by a display unit of the portable terminal in a manner such to permit an observer to visually recognize the image as a virtual image which overlaps with a front scenery,
the information configured to cause the portable terminal, upon receipt by the portable terminal by a near field wireless communication with the portable terminal, to determine a display mode of the image to be displayed on the display unit.

11. The near field wireless communication tag according to claim 10,
wherein the information is configured to cause the portable terminal to determine whether or not to horizontally invert the image as a display mode of the image to be displayed on the display unit.

* * * * *